US010410177B2

(12) United States Patent
Causey et al.

(10) Patent No.: US 10,410,177 B2
(45) Date of Patent: Sep. 10, 2019

(54) INTERACTIVE INVENTORY SYSTEMS AND METHODS

(75) Inventors: Mark Edward Causey, Tucker, GA (US); Brian Kevin Daly, Seattle, WA (US); Qingmin Hu, Sammamish, WA (US); Karen Mullis, Loganville, GA (US); Jamie Toren, Atlanta, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 159 days.

(21) Appl. No.: 13/539,327

(22) Filed: Jun. 30, 2012

(65) Prior Publication Data
US 2014/0006131 A1  Jan. 2, 2014

(51) Int. Cl.
*G06Q 10/00* (2012.01)
*G06Q 10/08* (2012.01)
*G06Q 30/02* (2012.01)

(52) U.S. Cl.
CPC ..... *G06Q 10/0875* (2013.01); *G06Q 30/0207* (2013.01); *G06Q 30/0251* (2013.01); *G06Q 30/0253* (2013.01)

(58) Field of Classification Search
CPC .............. G06Q 30/00; G06Q 30/0207; G06Q 10/0875; G06Q 30/0251; G06Q 30/0253
USPC ....................................... 705/14.24
See application file for complete search history.

(56) References Cited

U.S. PATENT DOCUMENTS

| | | | |
|---|---|---|---|
| 6,204,763 B1 | 3/2001 | Sone | |
| 7,448,546 B2 | 11/2008 | Jung | |
| 7,680,691 B2 | 3/2010 | Kimball | |
| 7,775,056 B2 | 8/2010 | Lowenstein | |
| 8,130,102 B1* | 3/2012 | Nguyen | F25D 29/00 340/3.1 |
| 2002/0143860 A1* | 10/2002 | Catan | G06K 17/0022 709/203 |
| 2004/0117274 A1* | 6/2004 | Cenedese | A47L 15/4293 705/28 |
| 2005/0060246 A1* | 3/2005 | Lastinger | G06Q 10/087 705/28 |
| 2005/0258961 A1 | 11/2005 | Kimball | |
| 2006/0175403 A1* | 8/2006 | Fossen McConnell | G06Q 30/02 235/385 |
| 2007/0152048 A1 | 7/2007 | Jung | |
| 2008/0184719 A1 | 8/2008 | Lowenstein | |
| 2009/0095813 A1 | 4/2009 | Chang | |

(Continued)

FOREIGN PATENT DOCUMENTS

CA    2829535 A1 *  4/2015

OTHER PUBLICATIONS

Ridden, Paul, LG Launches first Smart-Grid appliance: the Smart Fridge, Apr. 27th, 2011, NewAtlas (Year: 2011).*

*Primary Examiner* — Michael Bekerman
*Assistant Examiner* — Michael J Cross
(74) *Attorney, Agent, or Firm* — Hartman & Citrin LLC

(57) ABSTRACT

The subject disclosure provides devices, systems, and methods for interacting with a home inventory system. Home inventory systems may include appliances and storages which take inventory of their contents. Home inventory systems may interact with mobile devices to alert users of necessary or desired products. Using location information, users may be alerted when their mobile device is within proximity of a necessary or desired product.

14 Claims, 14 Drawing Sheets

(56) References Cited

U.S. PATENT DOCUMENTS

2011/0093326 A1\* 4/2011 Bous .................. G06Q 30/02
 705/14.38
2011/0173028 A1\* 7/2011 Bond .................. G06Q 10/08
 705/3

\* cited by examiner

INTERACTIVE INVENTORY SYSTEMS AND METHODS

BACKGROUND OF THE SUBJECT DISCLOSURE

Field of Disclosure

The subject disclosure relates to interactive inventory systems. More specifically, the subject disclosure relates to interactive residential or commercial inventory system and methods.

Background of Disclosure

When shopping, most people have to stop and think whether or not they already have products in their list of things to buy, or if products they need to buy are actually on their shopping list. When a commonly used consumable product depletes, the product may not be put on a list because there is still some left, even though the amount remaining is not enough for a full serving either by itself or with a recipe. When cooking a meal, people check for the main ingredients, but sometimes assume a smaller, commonly available ingredient, such as salt or flour, is available. Later, once they are well into the cooking process, they discover that they are currently out. This is not only frustrating, but can lead to inefficient purchases performed at the last minute because of a time constraint created by the in-progress cooking.

Consumers can find out about coupons and deals in their area, but the scope of these deals usually covers a greater area, which covers areas at greater distances than the consumer is willing to travel just to get the deal. Once a deal that the consumer is interested in is found, there are likely no interactive directions provided, but just an address or possibly a map of the location of the deal. Consequently, as the consumer travels about the greater area, they may pass right by a deal that they would be interested in if they happened to be close to it. However, even if they saw the deal earlier, there is nothing to alert them of the close proximity in which they now are. Some tasks are tied to specific products, such as charcoal for a barbecue and flour for baking a cake, which exist in many places, but without proximity alerts many consumers will wait until the last minute to actually purchase these products. One problem associated with this is that options may be slim at the last minute. Certain locations may be ruled out simply because of a time constraint. Monetary constraints may rule out other places, even though there may have been a special discounted rate offered earlier yet within the time frame that the consumer was aware of the upcoming event.

Buying in bulk can often save consumers money, and group purchases can result in even greater savings. While some consumers buy regularly used consumables in bulk, people rarely seek group purchases for these or other less often used consumables. People live in communities where group purchases can potentially include lots of consumers, yet purchases are performed individually.

DETAILED DESCRIPTION OF THE SUBJECT DISCLOSURE

Figure 1:
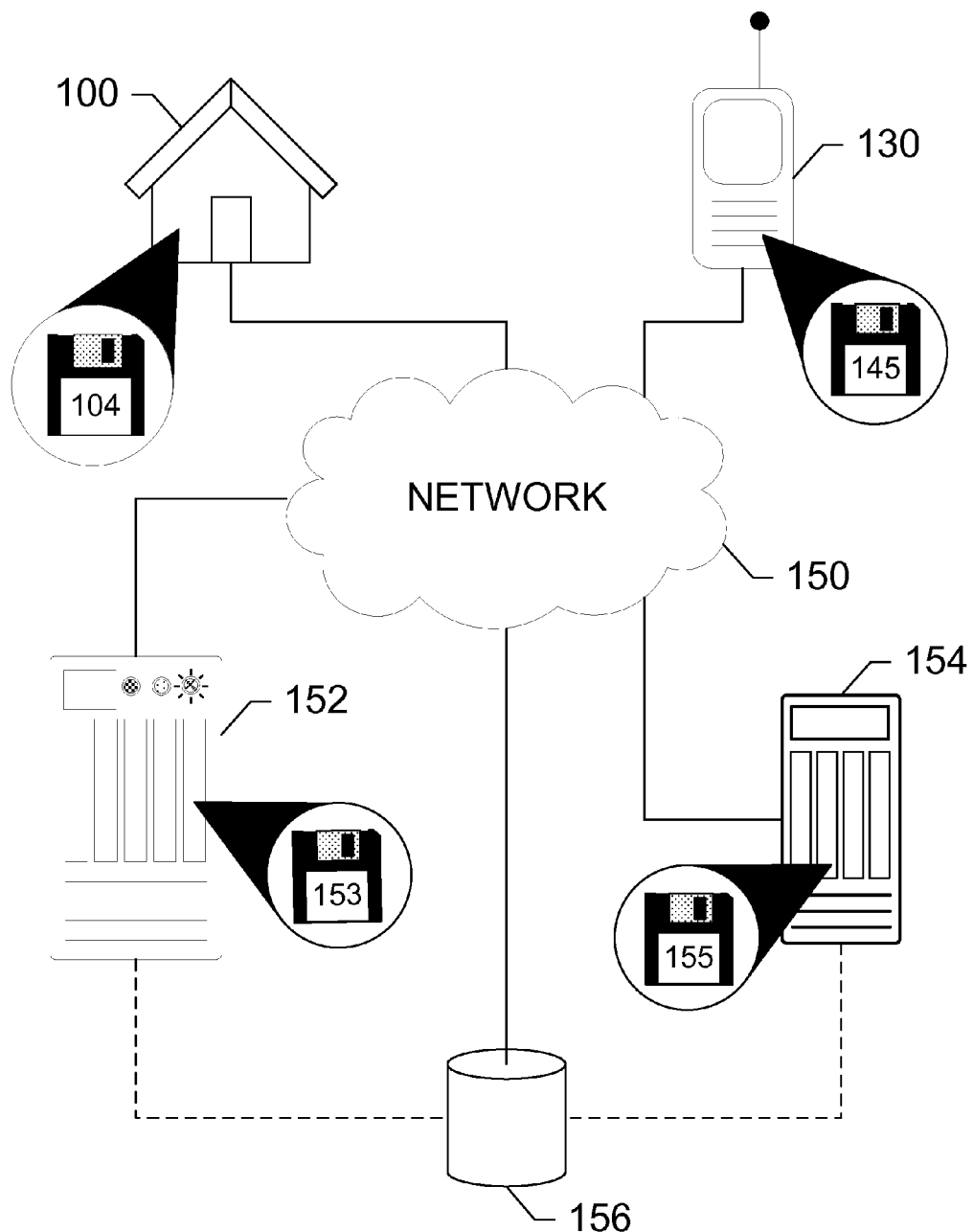
FIG. 1 shows a system which extends the functionality of an interactive inventory system, according to an example embodiment of the subject disclosure.

In one example embodiment, the subject disclosure may be a system. The system may include a server in communication with a mobile device, an inventory system, and a merchant server through a communication network, the inventory system associated with the mobile device, the server including a processor, a memory, and a logic. The logic may include computer instructions that when executed by the processor cause the processor to receive from the mobile device an activity entry associated with a product, determine, through communication with the inventory system, that the product is not available in a quantity required by the activity entry, transmit a request for the product to the merchant server, receive an offer from the merchant, the offer including a price of the product, and forward the offer to the mobile device.

In another example embodiment, the subject disclosure may be a computer readable storage medium having computer instructions stored thereon that, when executed by a processor, cause the processor to perform operations. These operations may include receiving from a mobile device an activity entry associated with a product, determining, through communication with a home inventory system associated with the mobile device, that the product is not available in a quantity required by the activity entry, transmitting a request for the product to a merchant server, receiving an offer from the merchant, the offer including a price of the product, and forwarding the offer to the mobile device.

In yet another example embodiment, the subject disclosure may be a computer-readable storage medium having computer instructions stored thereon that, when executed by a processor, causes the processor to perform operations. These operations may include receiving from a user input an activity entry associated with a product, determining, through communication with a home inventory system, that the product is not present in a quantity required by the activity entry, transmitting a request for the product to a merchant server, and receiving an offer from the merchant server, the offer including a price of the product.

The subject disclosure provides devices, systems, and methods for interacting with a residential, home or commercial inventory system. Examples are provided using a "home" inventory for sake of simplicity but it should be noted that the scope of the present subject disclosure expands to any residential and/or commercial environment where the use of the present subject disclosure would be beneficial, as appreciated by one having ordinary skill in the art. Thus, use of the term "home" is not intended to be limiting to a particular home environment. Example embodiments of the subject disclosure may include appliances and storages which take inventory of their contents. The home inventory system may be equipped with sensors which can read an RFID of, scan a barcode for, or optically recognize a specific product. These sensors can be coupled to a refrigerator, a pantry, or other storage units within a home, office, etc. A quantity or availability of consumable products such as paper towels, napkins, foil, pens, soap, etc. may be detected through sensors in a closet, laundry room, etc. Once any attributes of the product are detected, a server, either on-site, mobile, cloud-based, etc., may identify each product, total the products, and perform various tasks. The server may be in communication with a user's mobile device to provide updates and alerts, and may respond to queries from the mobile device. The server may also be in communication with a server of one or more stores that sell the products kept in the home inventory system. The server may receive information from the stores concerning pricing, quantities, special offers, and anything else. The server may be in communication with one or more databases storing information of each individual product including nutrition facts, expiration date, and even origin information in case of recalls.

With inventory being kept automatically by a server, several services may be provided simply by programming logic on the server. One such service may be comparing the inventory with a default inventory list including necessary products. A necessary product may be one that is missing or of a lower quantity than a preset amount, and may be ordered automatically from a store, or the user may simply be alerted. Expired products are handled similarly. When ordering new products, the server may determine which store to buy from based on user-specified preferences, budget, inventory, products needed, etc. The server may search for available coupons on the products needed when determining a store. A store server may have its own inventory management and customer tracking to make recommendations and otherwise assist in ordering. Should the store be sold out of a product, that store may suggest an alternate product. A home server may have its own preferences for this scenario so that it may reject offers for, for example, non-organic, non-vegan, non-kosher, generic brands, etc. Another task can be to respond to a query for a specific product from a mobile device. A more complex task can be to respond to a query of available meal options. The server can search recipes, comparing the ingredients of each recipe to the inventory. When a recipe contains ingredients present in the inventory, the user is alerted of the recipe as an option. More complex tasks also include complete dietary tracking, analysis, and recommendation. A complementary program is loaded onto the user's mobile communication device so that the user can keep diet information current even when eating out. Multiple homes in a neighborhood may link their servers or may communicate with a community server to order products collectively in bulk. This may allow users to buy cheaper (in bulk), and allows stores to upsell. Stores may have delivery programs which ensure fast delivery of cold or frozen products. The server may choose nearby stores for these products as well.

Other example embodiments of the subject disclosure may include recommendations based on a schedule of tasks, GPS positioning and navigation, and a user-input catalogue of specials, deals, discounts, coupons, etc., on a mobile device. The consumer may input activities into their schedule, such as baking a cake on Wednesday evening, and having a barbecue on Saturday. These activities may include routines, events, practices, tasks, celebrations, performances, contingencies, etc. Inventory systems may recognize anything in a schedule or calendar that can be associated with a product as an activity. Logic on the mobile device may analyze the activities in the schedule and may match the activity with products likely to be desired or needed on or prior to the activity. Once the product is identified, the catalogue may be searched for nearby deals, which are tagged by their location. When it is determined that the consumer is in proximity to such a location, the user may be notified of the deal, its proximity, the activity the product is needed or desired for, and provided directions to the deal. A database of deals and specials may be maintained on a central server. Merchants may update this database with their latest deals. Merchants may setup alerts to compete with active specials from other merchants. A carrier may maintain the database and charge merchants for providing advertising for them.

These exemplary embodiments may allow users to program their schedule with activities and wait for deal alerts just by going about their daily routine. For example, if the user is hosting a birthday party in two months, and happens to be within half a mile of a great paper plate discount, then the mobile device may recognize the need for the paper plates based on the activity, may find the deal, and may alert the user that the deal is within proximity. The mobile device may have known of this and other paper plate deals since the user entered the task a month ago, but the user may have been at least ten miles away from any deal. The mobile device may monitor the GPS and may wait until the user is within 1 mile (or any user set proximity) of any of the deals it finds. The mobile device may alert the consumer of a nearby detergent discount when it detects that detergent has not been purchased in the last 3 months. Advanced users may specify all of the details of deal alerts, such as a minimum discount, a maximum proximity, or even a formula for determining proximity based on the amount of discount received. In other words, a user may be alerted of a half-price deal 3 miles away, but not of a 25% discount 2 miles away. Users may allow stores to see their schedule and location in order to make instant offers. A party store may receive an alert that a user who is hosting a birthday party in two months is nearby. Since the store knows the user may not be looking for paper plates at this moment, given the birthday party is not soon, the store may realize the user may not be nearby when specifically looking for paper plates. Based on this the store may want to give the user an added incentive in the form of a deal that the store can deliver straight to the mobile device of the user.

There are many different ways to embody the subject disclosure. For simplicity, the following example embodiments present, for the most part, a minimal amount of structure necessary to achieve the functions of the subject disclosure. In many of the following example embodiments, one device, network, terminal, memory, logic, etc., is shown where a plurality may be used in tandem to achieve the same function. Those having skill in the art will recognize these pluralities, which are within the scope of the subject disclosure.

FIG. 1 shows a system which extends the functionality of an interactive home inventory system, according to an example embodiment of the subject disclosure. The system may include home inventory system 100 including a home inventory logic 104, a mobile device 130 including a consumer logic 145, a network 150, a central inventory server 152 including inventory logic 153, a merchant server 154 including merchant logic 155, and a database 156. Home inventory system 100 may take an inventory of household consumables and other applicable products so that the inventory is available when making decisions about product alerts, recipe recommendations, etc. Home inventory system 100 may be in communication with mobile device 130 via network 150, or by any other means such as a local area network (LAN), personal area networks including BLUETOOTH®, near-field communication (NFC), etc. Network 150 may further enable communication with other entities, such as central inventory server 152, merchant server 154, and database 156. Home inventory logic 104 may track the purchase, arrival, and removal of products using systems and methods discussed hereinafter. Network 150 may be any personal, local, or wide-area network based on any presently known or later developed communication technologies including Global System for Mobile communications (GSM), General Packet Radio Service (GPRS), Universal Mobile Telecommunication System (UMTS), Wideband Code Division Multiple Access (W-CDMA), Long-Term Evolution (LTE), NFC, WiFi, BLUETOOTH®, ZIGBEE®, Z-WAVE®, etc. Network 150 may include a mixture of wireless and wired technologies, and may cover a large enough area to maintain communication with mobile device 130 no matter what the location of mobile device 130 may be. Network 150 includes the internet.

Mobile device 130 may include hardware and logic such as consumer logic 145 for displaying a user interface, receiving user input, determining a location, and storing and executing applications and services included within consumer logic 145. The mobile device can be an electronic device capable of wirelessly sending and receiving, even if this may not be the primary function of the device. Examples of such devices may include cellular telephones, personal digital assistants (PDAs), portable computers, consumer electronics, appliances, etc. Consumer logic 145 may perform calculations and output determinations based on the household inventory, data received from central inventory server 152 and merchant server 154, and local information such as preferences and location data, as further described herein. Consumer logic 145, and other logic discussed herein may be based on any presently known or later developed technologies including digital and/or analog hardware circuits, etc.

Central inventory server 152 may include hardware that, in conjunction with inventory logic 153, is enabled to receive, store, and process data useful to a user of home inventory system 100. Central inventory server 152 may be in communication with home inventory system 100, mobile device 130, merchant server 154, and database 156 directly or via network 150. Inventory logic 153 may perform calculations and output determinations based on the inventory of products within home inventory system 100, local data and data from merchant server 154, and data received from mobile device 130 such as preferences and location data. Inventory logic 153 may work in tandem with consumer logic 145. Information and data used by consumer logic 145 and inventory logic 153 may be stored on both mobile device 130 and central server 152 to enable substantially complete separate functionality when mobile device 130 and central server 152 are out of communication with each other. Merchant server 154 may include hardware to receive, store, and process data useful to a user of home inventory system 100 to the benefit of a merchant. Among the data stored on merchant server 154 may be merchant logic 155.

Merchant server 154 may be in communication with home inventory system 100, mobile device 130, central inventory server 152, and database 156 directly or via network 150. Merchant logic 155 may compare information received from home inventory system 100, mobile device 130, and central server 152 with information about products and services offered by a merchant to provide recommendations, deals, offers, rewards, etc. Merchant logic 155 may update database 156 with information concerning product recalls, expiration dates, warranties, and other details that may be helpful to a user of home inventory system 100 or any other consumer.

Database 156 may include hardware to store product information such as recalled products, expiration dates, etc. This product information may be stored on a per-product basis including a reference to a product's bar code, RFID tag, serial number, etc. Database 156 may be updated by merchant server 154 and may be accessed by home inventory system 100, mobile device 130, and central server 152 for information that may be relevant to products within home inventory system 100 or products that may be of interest to a user of home inventory system 100. Database 156 may further include purchase records or electronic receipts of purchases performed by the user. These records may be correlated with the bar code, RFID tag, etc., as well as with known or received merchant information, to accurately track the user's purchases and update the inventory accordingly. Further, database 156 may include a plurality of user information that may be disseminated or accessible to third parties such as merchants, lenders, etc., with an option being provided to the user so as to control such dissemination via privacy layers and permission levels.

Figure 2:
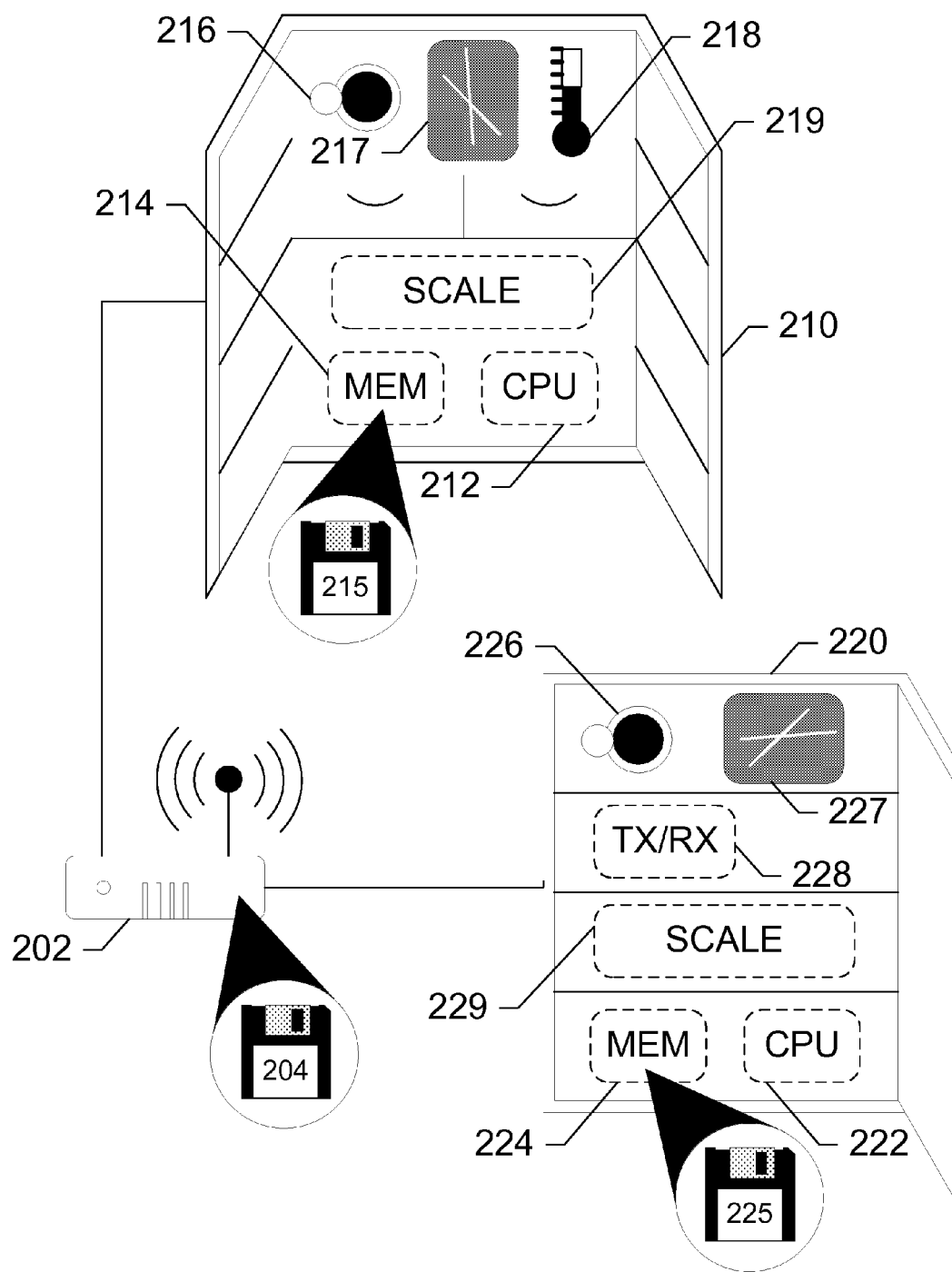
FIG. 2 shows an interactive inventory system, according to an example embodiment of the subject disclosure.

FIG. 2 shows an interactive home inventory system, according to an example embodiment of the subject disclosure. A home inventory system may include a router 202 having home inventory logic 204 programmed therein, a refrigerator 210, and a pantry 220. Router 202 may include hardware along with logic 204 for receiving, storing, and processing inventory data related to household consumables and other applicable products. The resulting inventory may be available when making decisions about product alerts. Router 202 may be in communication with refrigerator 210 and pantry 220 through wired or wireless communication. Home inventory logic 204 may track the purchase, quantity, addition, and removal of products by communicating with refrigerator 210, pantry 220, a mobile device of the user of the home inventory system, etc.

Refrigerator 210 may include a processor 212, a memory 214 storing refrigerator logic 215, a camera 216, an RF scanner 217, a thermometer 218, and a scale 219. Processor 212 may execute computer instructions, such as those within refrigerator logic 215, to perform operations according to the computer instructions. Processor 212 may incorporate any presently known or later developed technologies including computer processors (processing units), microprocessors, digital signal processors, controllers and microcontrollers, etc. Memory 214 may be a computer-readable medium for storing instructions such as refrigerator logic 215, and any other data or information necessary or helpful in performing the operations of the stored instructions. Memory 214 may be any presently known or later developed technologies, including RAM (random access memory), flash memories, ROMS (read-only memories), EPROMS (erasable programmable read-only memories), EEPROMS (electrically erasable programmable read-only memories), or any other storage device or medium. Refrigerator logic 215 may include instructions, which when executed by processor 212, cause the processor to perform operations which may include taking readings from sensors to identify products and their respective quantities, amounts, etc., within refrigerator 210. This identification may assist the home inventory system in tracking the arrival and removal of products within refrigerator 210.

Camera 216 may capture visual information helpful in the identification of products. This visual information may include a product bar code, serial number, packing appearance, logo, amount remaining, etc. Camera 216 may send the information to processor 212, upon request, to assist in the execution of instructions of refrigerator logic 215. Camera 216 may utilize any presently known or later developed image capturing technology. Camera 216 may be stationary or mobile using hardware such as a pivot, arm, track, etc. RF scanner 217 may capture bar codes and other visual data helpful in the identification of products. RF scanner 217 may send information to processor 212, upon request, to assist in the execution of instructions. Thermometer 218 may capture the temperature of refrigerator 210 or individual product within refrigerator 210. These temperatures may be useful in determining the state of products, whether or not certain products are still fit for consumption, etc. Thermometer 218 may send these temperatures to processor 212, upon request, to assist in the execution of instructions. Thermometer 218 may employ any presently known or later developed technology for determining temperature such as mercury expansion, infrared detection, etc. Scale 219 may measure the weight of products stored within refrigerator 210. This weight measurement information may be useful in determining the state of products, how much of a product remains, etc. Scale 219 may send the information to processor 212, upon request, to assist in the execution of instructions. Scale 219 may utilize any presently known or later developed technology for measuring the weight of individual products. Scale 219 may exist in multiples, may determine local weight, etc., to determine the weight of a specific product. Although these types of sensors are shown in specific configurations, it may be recognized that a plurality of additional sensors may be distributed strategically with the intention of maximizing the types of relevant information related to products in order to enable optimal inventory updating.

Pantry 220 may include a processor 222, a memory 224 storing pantry logic 225, a camera 226, an RF scanner 227, a transceiver 228, and a scale 229. Processor 222 may execute computer instructions, such as those within pantry logic 225, to perform operations according to the computer instructions. Memory 224 may be a computer-readable medium for storing instructions such as pantry logic 225, and any other data or information necessary or helpful in performing the operations of the stored instructions. Pantry logic 225 may include instructions that, when executed by processor 222, cause the processor to perform operations including taking readings from sensors to identify products and condition/state of products within pantry 220. This identification may assist the home inventory system in tracking the arrival and removal of products within pantry 220. Camera 226, RF scanner 227, and scale 229 may be similar in structure and perform functions similar to camera 216, RF scanner 217, and scale 219, respectively, and may similarly be situated at several strategically selected locations throughout pantry 220. Transceiver 228 may capture wireless signals helpful in the identification of products. These wireless signals may include those emitted by RFID tags and other wirelessly transmitted product information. RFID tags can incorporate any presently known or later developed communication technologies including passive RFID, active RFID, NFC technology, etc. Transceiver 228 may send information to processor 222, upon request, to assist in the execution of instructions within pantry logic 225.

Figure 3:
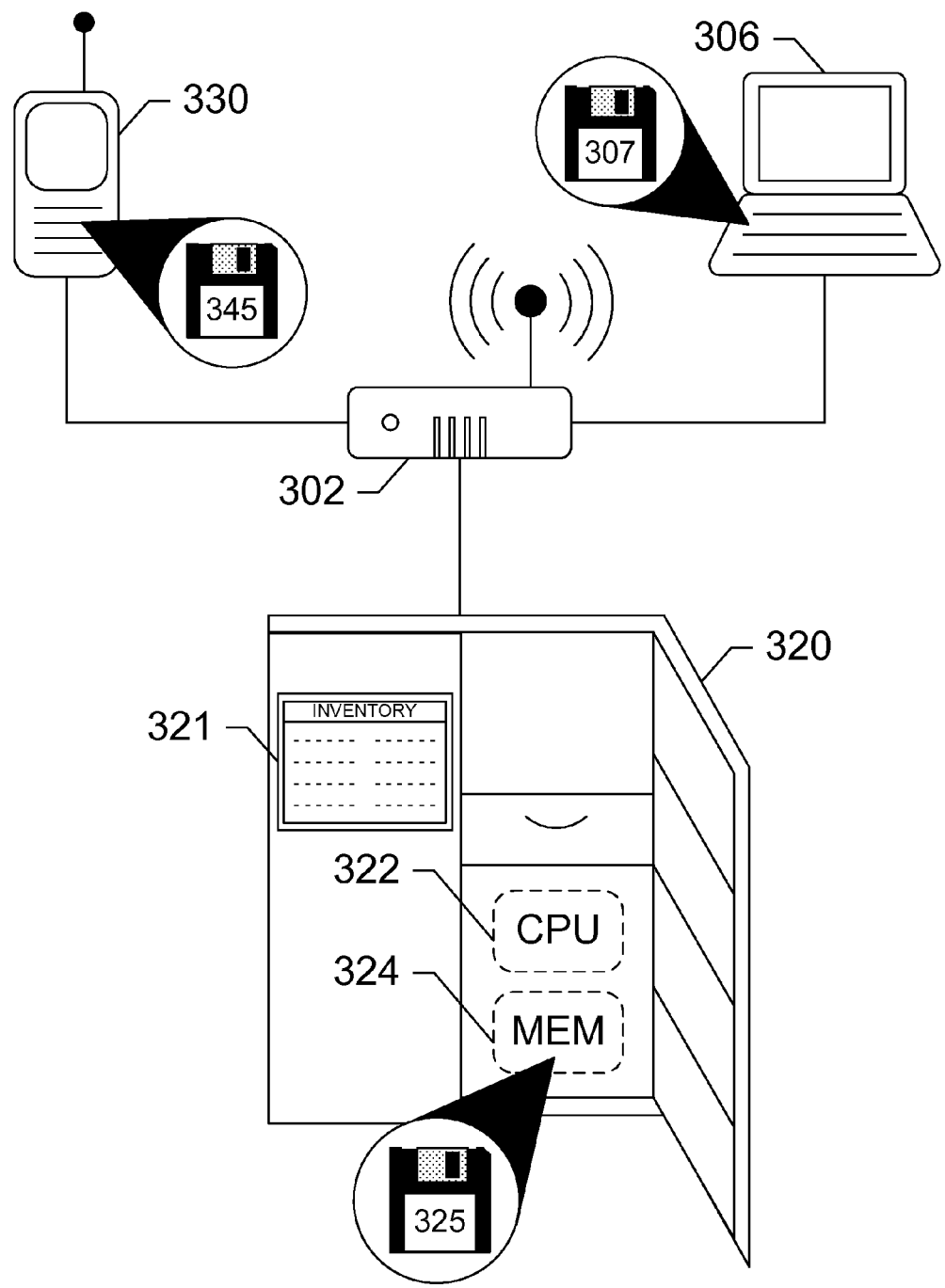
FIG. 3 shows various devices for interacting with a inventory system, according to an example embodiment of the subject disclosure.

FIG. 3 shows various devices for interacting with a home inventory system, according to an example embodiment of the subject disclosure. These devices may include a mobile device 330 including consumer logic 345, a computer 306 including consumer logic 307, and a refrigerator 320 including consumer logic 325, all of which may be in communication via router 302. Mobile device 330 may be carried by a user of a home inventory system and may be the most readily available device for interacting with the home inventory system. For instance, mobile device 330 may communicate (wirelessly or wired) with router 302 from a plurality of locations within or outside a home of the user. However, mobile device 330 may have constraints due to size, energy, and processing limitations. For this reason, the user may desire other devices to interact with the home inventory system. Consumer logic 307 may exist on any desktop or laptop computer such as computer 306. Computer 306 may allow the user to interact more easily with the home inventory system, and also may yield extended functionality in interacting with the home inventory system, for instance by providing a more robust user interface, faster processing, etc.

Refrigerator 320 may include touch screen 321, processor 322, memory 324, and consumer logic 325 to enable the consumer to interact with the home inventory system at an opportune moment. Instead of opening the refrigerator door to browse through available products, the user may simply browse the products on touch screen 321. This may keep products in refrigerator cool while the user is browsing which may preserve certain products longer and decrease energy expenses. Touch screen 321 may be in communication with a plurality of sensors within refrigerator 320. Touch screen 321 may combine a transparent touch-sensitive surface, which may utilize any currently known or later developed touch-sensing technologies, including Multi-touch Capacitive Technology, Touch Resistive Technology, Multi-touch Optical Technology, Touch Wave Technology, Force Based Sensing, Near Field Imaging, etc., and a display, which may be any of the currently known or later developed display technologies including Light Emitting Display (LED), Liquid Crystal Display (LCD), Electroluminescent Display (ELD), Organic Light Emitting Diode (OLED), Carbon nanotubes, nanocrystal displays, etc. This combination may allow a user to enter input and view output in interacting with the home inventory system through consumer logic 325. Consumer logic 345, 307, and 325 may be stored on the memory of the respective devices, or may be accessed through a web portal from a device such as a central inventory server or router 302.

Figure 4A:
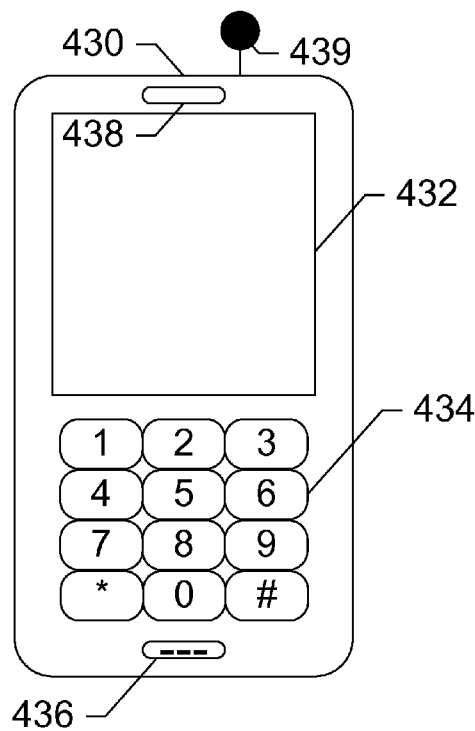
FIGS. 4A and 4B show a mobile device for interacting with a inventory system, according to an example embodiment of the subject disclosure.
Figure 4B:
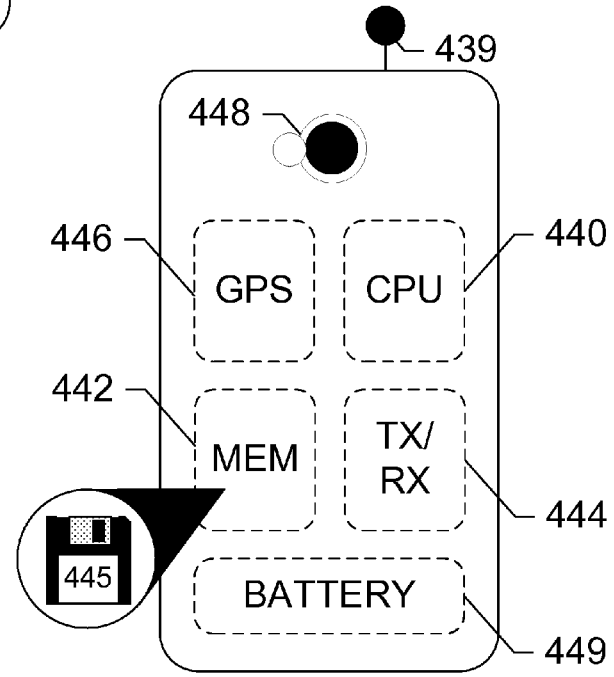

FIGS. 4A and 4B show a mobile device for interacting with a home inventory system, according to an example embodiment of the subject disclosure. Mobile device 430 may include a display 432, an input 434, a microphone 436, a speaker 438, and an antenna 439. Display 432 may be used as visual output for mobile device 430, and may be any of the currently known or later developed display technologies including Light Emitting Display (LED), Liquid Crystal Display (LCD), Electroluminescent Display (ELD), Organic Light Emitting Diode (OLED), Carbon nanotubes, nanocrystal displays, etc. For example, display 432 may show a phone number being entered by a user, the status of a home inventory system, etc. Input 434 may be, for example, a keypad used for entering numbers, querying a home inventory system, or carrying out assigned functions. Mobile device 430 may further include a microphone 436 and a speaker 438, through which voice communication with users of other mobile devices, interactive voice response (IVR) systems, etc. is possible. Microphone 436 may be used for oral input, and may be utilized for voice-activated functionalities of mobile device 430. For example, the user may speak the name of a product suspected to be within the home inventory system to command mobile device 430 to query the home inventory system for the product automatically. Microphone 436 and speaker 438 may utilize any currently known or later developed technologies including microphones and speakers currently being employed in consumer mobile devices or any other suitable microphone and speaker. Antenna 439 may be a transducer for transmitting and receiving wireless radio frequency (RF) signals to and from wireless networks, network nodes, and other wireless communication devices including a wireless base transceiver station (BTS), WiFi access point, etc.

FIG. 4B shows the inner components of mobile device 430, according to an example embodiment of the subject disclosure. The inner components of mobile device 430 may include a processor such as CPU 440, a memory 442 storing a consumer logic 445, a transceiver 444, a positioning system such as GPS 446, a camera 448, and a battery 449. Processor 440 may be used to execute various functions when instructed to do so by programs and other logic stored on memory 442 or any other data storage of mobile device 430 such as a smart card, a memory card slot, etc. Processor 440 may incorporate any presently known or later developed technologies including computer processors (processing units), microprocessors, digital signal processors, controllers and microcontrollers, etc. Consumer logic 445, which may be stored on memory 442, may be executed by processor 440 to interact with a home inventory system via, for instance, a user interface provided by consumer logic 445. This interaction may include inputting purchase of products, verifying an identity of a detected product, inquiring about the current inventory or product status, and receiving product alerts.

Furthermore, a transceiver 444 may be used to transmit and receive data and signals to and from processor 440 of mobile device 430. Transceiver 444 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Many wireless communication devices may have more than one transceiver or a transceiver that supports more than one protocol. A single wireless communication device can support cellular radio frequency (RF), Global System for Mobile communications (GSM), General Packet Radio Service (GPRS), Universal Mobile Telecommunication System (UMTS), Wideband Code Division Multiple Access (W-CDMA), Long-Term Evolution (LTE), NFC, WiFi, BLUETOOTH®, ZIGBEE®, and Z-WAVE® protocols. A wireless communication device capable of multiple modes of wireless communication, such as cellular, WiFi, NFC, etc., may contain a plurality of antennas on a single device. For example, an NFC-enabled wireless communication device may have separate antennas for cellular and NFC communications.

GPS 446 may communicate with positioning satellites to determine the position of mobile device 430 anywhere in the world. GPS 446 may utilize any presently known or later developed positioning technology, such as, Global Positioning System (GPS), GALILEO, Global Navigatsionnaya Sputnikovaya Sistema (GLONASS), etc. Positioning information may also be determined through communication with terrestrial base stations using information provided by the terrestrial base stations and a calculation of the response time associated with the communication. Camera 448 may capture visual information helpful to the home inventory system such as product images, bar codes, receipt images, ads, coupons, etc. Battery 449 may be used to power mobile device 430. Battery 449 can be any of the presently known or later developed technologies used in mobile devices or used in powering communication components including Lithium-Ion batteries, lithium-polymer batteries, molten salt batteries, etc. Further, battery 449 may be charged via a power port (not shown), inductively, or via a power source coupled to a cover applied to mobile device 430.

Figure 5:
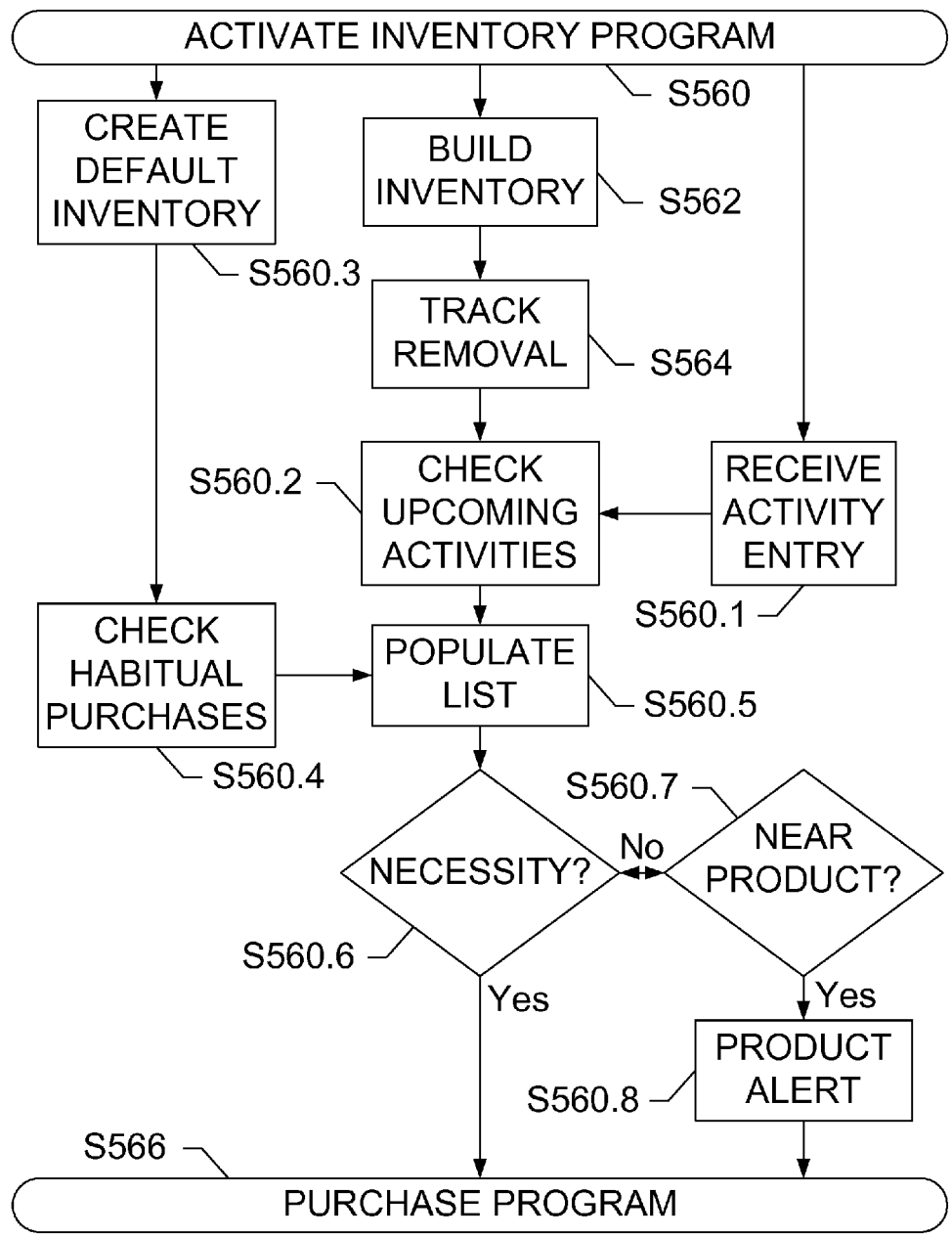
FIG. 5 shows a method for maintaining an inventory and alerting a user of purchases, according to an example embodiment of the subject disclosure.

FIG. 5 shows a method for maintaining an inventory and alerting a user of purchases, according to an example embodiment of the subject disclosure. The method may begin when the inventory program is activated (S560) by a mobile device, router, central inventory server, or any other component of a home inventory system. In order to make analyses and perform determinations based on the inventory, the inventory may first be built (S562). Details of inventory build process S562 are described hereinafter with respect to FIG. 7. Once an inventory is built, usage or removal of products from that inventory may be tracked (S564). Details of removal tracking process S564 are described hereinafter with respect to FIG. 8.

Among the various information that a user of the home inventory system may input include a schedule and a default inventory. This information may be useful though not required for operation of the home inventory system. When the user first sets up the home inventory system, or at regular intervals, the user may create or add products to a default inventory (S560.3). The default inventory may be a list of products that the user uses on a regular basis. The default inventory may specify brands or types of products, and may also include a minimum quantity of each product. Products may be added to the default inventory, or may be automatically learned through monitoring the inventory for habitual purchases (S560.4). The home inventory system may also interact with a user's schedule, and may receive activity entries (S560.1) from the user through a mobile device, computer, etc. The user may additionally specify their own rates of use or modify the default inventory to account for additional users (such as guests, etc.).

Periodically or upon user command, the inventory may be compared with the default inventory (S560.3) and the schedule (S560.2) to determine products that may be desired or needed. A list of products that may be desired or needed may be populated (S560.5) for the user to view and for use in performing further analysis. For each product on the list that may be desired or needed, a decision of whether the product is desired or needed may be made (S560.6) to determine a priority. If a product is determined to be a necessity, then a purchase program S566 may be activated automatically to minimize the action required of the user. The purchase program may include automatically purchasing the necessary products, e.g., from an online vendor, or automatically adding the products to a shopping list and providing subsequent purchase alerts to the user. However, if a product is determined not to be a necessity, then the location of the user may be monitored (S560.7) until the user is near an available product.

If the location of the user is determined to be near an available product, then the user may be notified through a product alert (S560.8) on a mobile device. Though a product may initially be determined not to be a necessity, due to a low but not empty container, or an activity being in the distant future, a product may later be determined to be a necessity based on the container becoming empty or the activity becoming part of the near future. For this reason, necessity determination S560.6 may be repeated periodically if the location of the user has not been within proximity of a desired product. Once product alert S560.8 has been issued, the user may still choose to activate purchase program S566 to ensure proper entry of the product into the inventory or because the user may not have time to make a stop.

Figure 6:
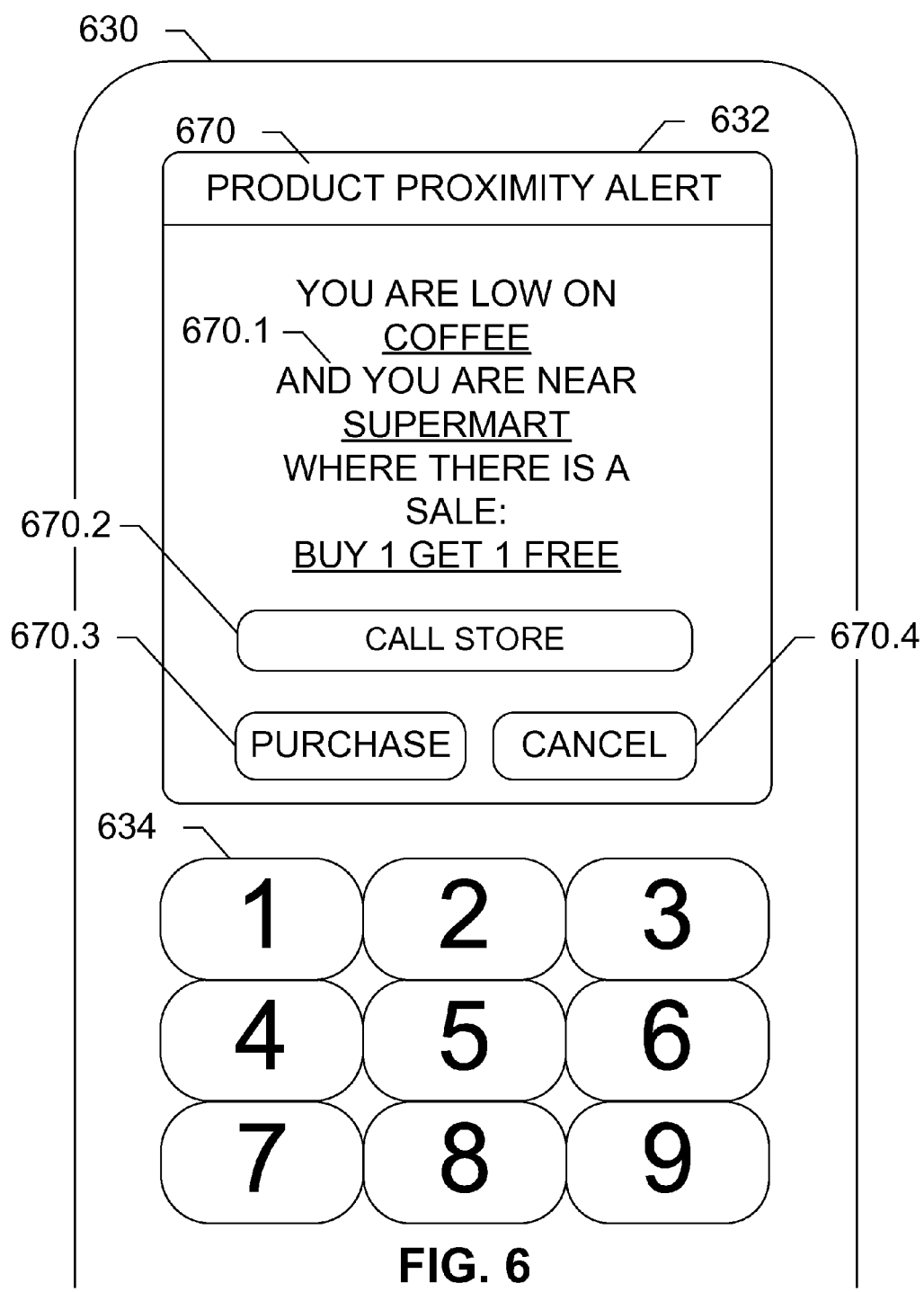
FIG. 6 shows a user interface featuring a product alert, according to an example embodiment of the subject disclosure.

FIG. 6 shows a user interface featuring a product proximity alert 670, according to an example embodiment of the subject disclosure. Product proximity alert 670 may be displayed on a display 632 of a mobile device 630. Product proximity alert 670 may include a product alert message 670.1 including details of product proximity alert 670, an option to contact a merchant 670.2, a purchase option 670.3, and a cancellation option 670.4. Product alert message 670.1 may include a short description of the product which may be desired or needed, a name of a merchant where the desired or needed product is being sold, and a price, current deal, or applicable coupon or offer. Option to contact the merchant 670.2 may link the user to a phone number or other address to contact the merchant from mobile device 630. Selecting option to contact the merchant 670.2 may automatically dial a telephone number or initiate a video chat session with the merchant. Option to contact the merchant 670.2 may be useful in reserving a product or putting a product on hold until the user can arrive at the merchant's store to purchase the product.

For users who want to take advantage of the deal, but do not want to take the time to stop at the merchant's store, purchase option 670.3 may be selected to allow the user to make an electronic purchase of the product using mobile device 630. Cancellation option 670.4 may be selected to allow the user to acknowledge the alert, but return to the previous screen or program running on mobile device 630. Option to contact the merchant 670.2, purchase option 670.3, and cancellation option 670.4 may be activated by utilizing an input 634. Display 632 may be a touch screen allowing the user to activate option to contact the merchant 670.2, purchase option 670.3, and cancellation option 670.4 simply by touching the area of display 632 showing the respective option. Other options that are not shown but may be provided include a "remind me later" option enabling a subsequent alert, an "alternative" option for seeking out better deals that may be a little farther away, or additional options to block or unsubscribe from alerts related to specific products, prices, or merchants.

Figure 7:
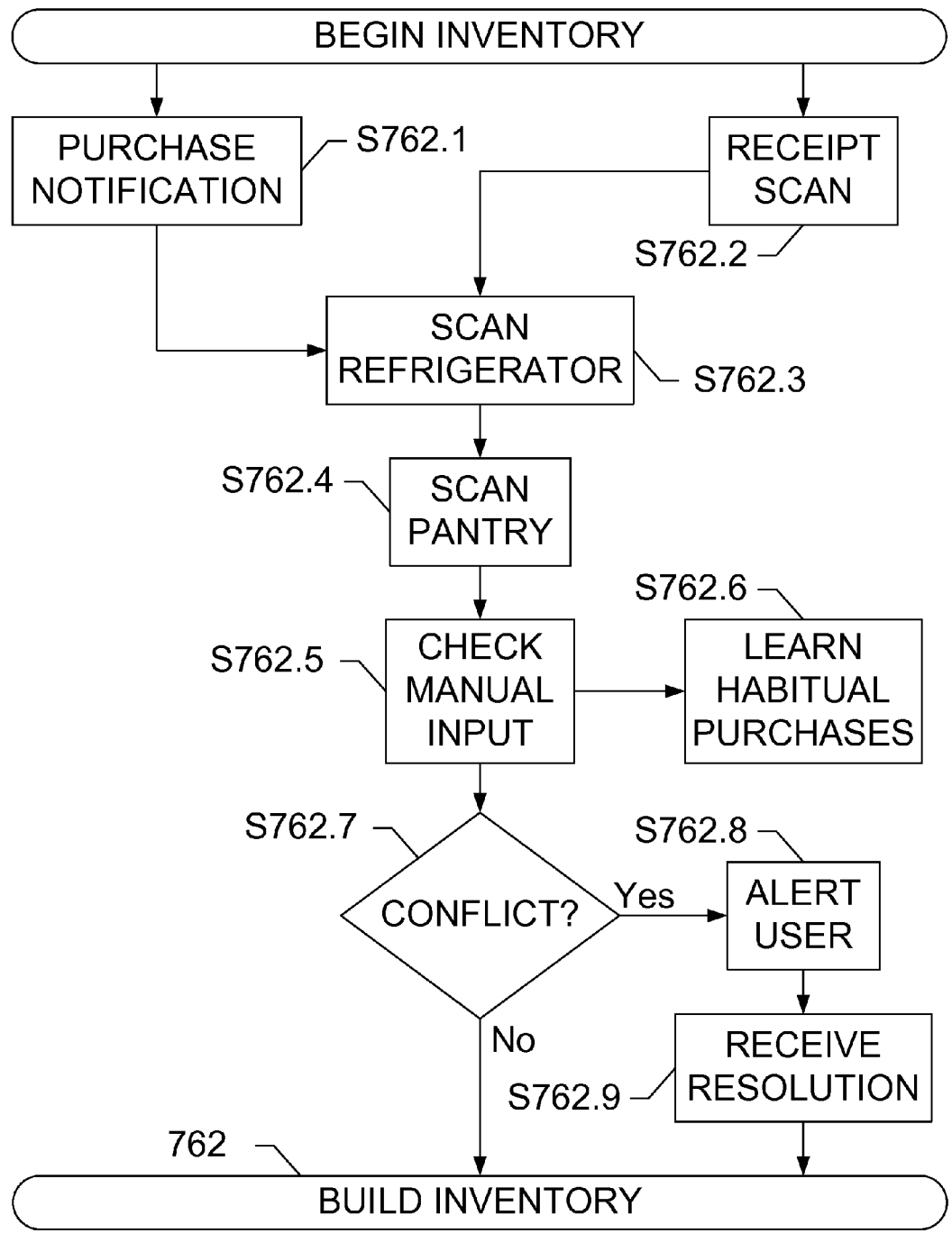
FIG. 7 shows a method for building an inventory using an interactive inventory system, according to an example embodiment of the subject disclosure.

FIG. 7 shows a method for building an inventory using an interactive home inventory system, according to an example embodiment of the subject disclosure. The method may begin when the home inventory system receives a notification that a user has purchased a specific product (S762.1). Purchase notification S762.1 may be sent by a user from a mobile device in response to a user removing a product from a shopping list or otherwise indicating that the product has been purchased. Purchase notification S762.1 may also be sent from a merchant that has recently sold the user the product. The merchant may have identified the user by the use of a credit card, enrollment in a consumer rewards program, etc. The method may also begin when the user uses the mobile device to scan a receipt after making a purchase of many products (S762.2). Receipt scan S762.2 using the mobile device may save the user time over confirming the purchase of each product individually.

Once the home inventory system is notified of a product, it may monitor the inventory for that product to appear. The home inventory system may perform a scan of a refrigerator for the product (S762.3), and may also perform a scan of a pantry for the product (S762.4). Scans S762.3 and S762.4 may be performed periodically or upon some event, such as a location of the mobile device being within proximity of the user's home, a door of the pantry or refrigerator being opened, etc. The user may also manually confirm that the product has been transferred into the inventory since the purchase. This and other manual confirmations may be stored within the home inventory system where it may be referenced by the system in confirming the inventory (S762.5). Though the user may have created a default inventory, the home inventory system may learn of habitual purchases that the user has neglected to add to the default inventory (S762.6). Adding habitual purchases to the default inventory list may further assist the user in purchasing newly discovered products or increases in the frequency of commonly used products.

Confirmation from the user may ensure that products which are purchased or otherwise acquired for other people are not mistakenly assumed to be part of the user's inventory. A conflict may arise, for instance, when a purchased product has not been detected within the home inventory system nor has it been confirmed by the user manually after a specified time period, or when some products from a recent receipt scan have been detected within the inventory, but other products have not (S762.7). If there is a conflict, then the home inventory system may issue an alert to the user (S762.8). User alert S762.8 may be sent to a mobile device of the user. Once the alert has been received by the user, the user may respond with a resolution (S762.9). This resolution may confirm that the product has been placed within the inventory, confirm that the product was not purchased for the user's own inventory, confirm that the user did leave the product in a car, etc. Once all of the conflicts have been resolved, a list of all of the products in the inventory may be created or updated (S762).

Figure 8:
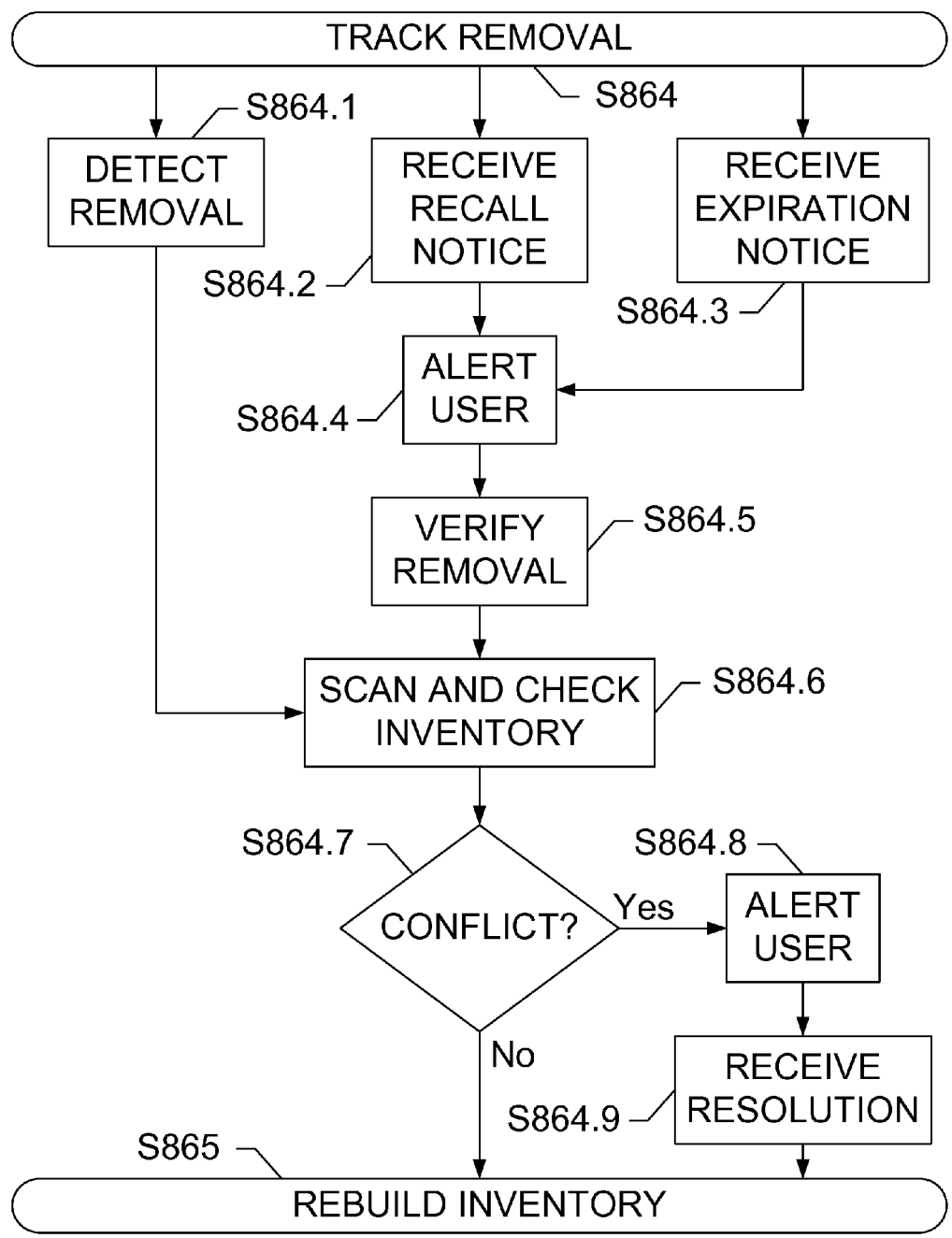
FIG. 8 shows a method for alerting a user of removal and tracking removal of products in an interactive home inventory system, according to an example embodiment of the subject disclosure.

FIG. 8 shows a method for alerting a user of removal and tracking removal of products in an interactive home inventory system, according to an example embodiment of the subject disclosure. There may be several reasons for a user to remove a product from inventory. One possible reason is that the user has simply used the entire product through normal use. In this case, the home inventory system may detect the removal of the product as it is used (S864.1). A removal may be detected upon a determination that the product quantity or amount has dropped to zero, has fallen below some predefined threshold, or has simply decreased in amount. For instance, using the 2nd-to-last roll of toilet paper may trigger a removal S864.1. In some cases, a product may be subject to a recall. Recalled products may be provided to a database accessible by the home inventory system, for instance from a merchant server that may actively contact home inventory systems that include a product subject to a recall, or from external sources of information such as the internet. In either event, the inventory system may receive notice of the recalled product (S864.2). If the home inventory system receives such a notice, or a recalled product is otherwise identified, then an alert may be issued to the user (S864.4) through a mobile device, via text message, e-mail, launching an alert application, etc. Another trigger for user alert S864.4 may be upon expiration of a product. The home inventory system may receive notice of an expiration of a product (S864.3) upon checking a database of product expiration dates, contact from a merchant server, etc. A purchase or arrival of the product into the fridge/pantry may start a timer, with notice S864.3 being generated upon expiration of the timer. User alert S864.4 may specify the product and the location within the home inventory system, such as refrigerator, kitchen pantry, first floor closet, etc. The home inventory system may then wait for verification that the product has been removed by the user. The user may verify the removal of a product (S864.5) through the mobile device, etc. The removal S864.5 may be determined via sensors coupled to the storage unit where the product is stored.

Once removal verification S864.5 has been received, the home inventory system may perform a scan of the inventory to ensure that the product is no longer within the inventory system (S864.6), as opposed to merely placed in a different location. If there is a conflict that may stem from a removed product being detected as within the inventory (S864.7), then the home inventory system may issue an alert to the user (S864.8). User alert S864.8 may be sent to a mobile device of the user. Once the alert has been received by the user, the user may respond with a resolution (S864.9). This resolution may confirm that the product has been removed from the inventory, confirm that the user has left the product within the inventory, etc. Once all of the conflicts have been resolved, a list of all of the products in the inventory may be updated (S865).

Figure 9:
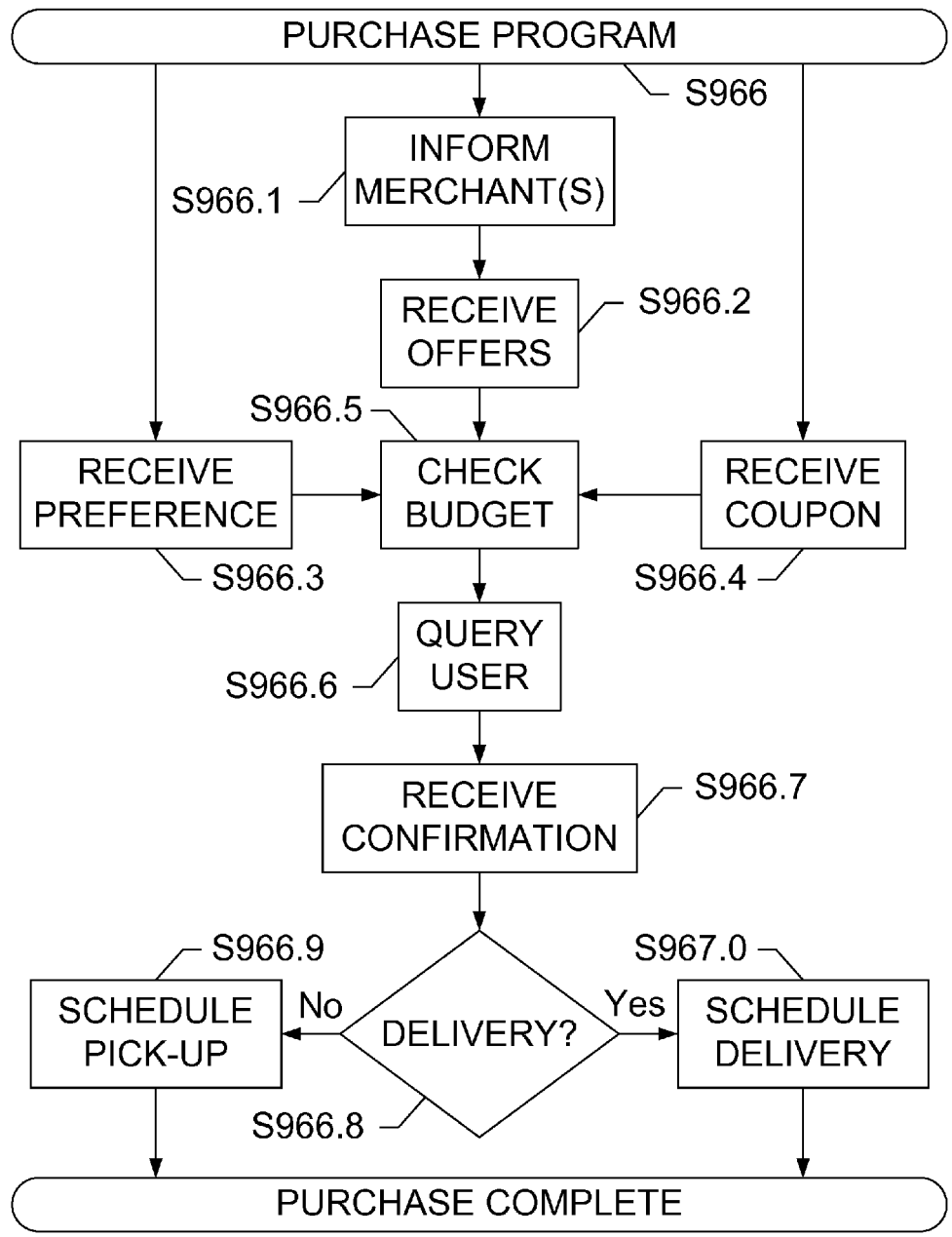
FIG. 9 shows a method for making informed purchases through an interactive home inventory system, according to an example embodiment of the subject disclosure.

FIG. 9 shows a method for making informed purchases through an interactive home inventory system, according to an example embodiment of the subject disclosure. Purchase program 8966 may begin upon a user command to purchase a product, upon a determination by the home inventory system that a necessary product is low or depleted, etc. Merchants are informed of the interest in the product through communication with a central inventory server, directly from a mobile device or router, etc. (S966.1). Once the merchants receive notification of the user's interest in the product, the merchants may respond with offers for the product (S966.2). These offers may then be received, and a calculation may be made based on the best offer. Such a calculation may be made in consideration of preferences and coupons that may be provided by the merchants or by a third party. The calculation may also take into consideration potential reward/loyalty point accumulations associated with the merchants making the offer. At any point, the user may enter a preference, special need, etc., which is received and stored for future consideration (S966.3). Any coupon that the user may find may also be received and stored for future consideration (S966.4). In consideration of these offers, preferences, coupons, and other information, a budget of the user may be checked in order to determine one or more viable options for the user (S966.5). The budget may be stored on a profile associated with the user located on a cloud database, for example, as described in the co-pending U.S. application Ser. No. 13/539,338, entitled "Generating and Categorizing Transaction Records," which is incorporated by reference herein in its entirety into this disclosure. Portions of the budget may be specified by the user to be accessible to merchants, such that merchants may customize their offers to the user in an effort to solicit the user's business at their venue.

Upon a determination of one or more options for the user, these options are presented to the user (S966.6) through a mobile device, home computer, etc. The options may be provided as a fillable form displayed on a browser application on the mobile device or computer. A confirmation of a single option (S966.7) or a selection among multiple options may then be received from the user. During the purchasing process, communication may be established with a merchant server, which may give an option to deliver the product or arrange for a pick-up (S966.8). If a pick-up is selected, then the user may schedule a date and time to retrieve the product (S966.9). If a delivery is selected, then the user may schedule a date and time for the product to arrive at the user's house (S967.0). Scheduling of a delivery or pick-up may not need to be arranged according to an exact date or time, but such an arrangement can be particularly useful when delivering products such as perishable goods, valuables, etc.

Figure 10:
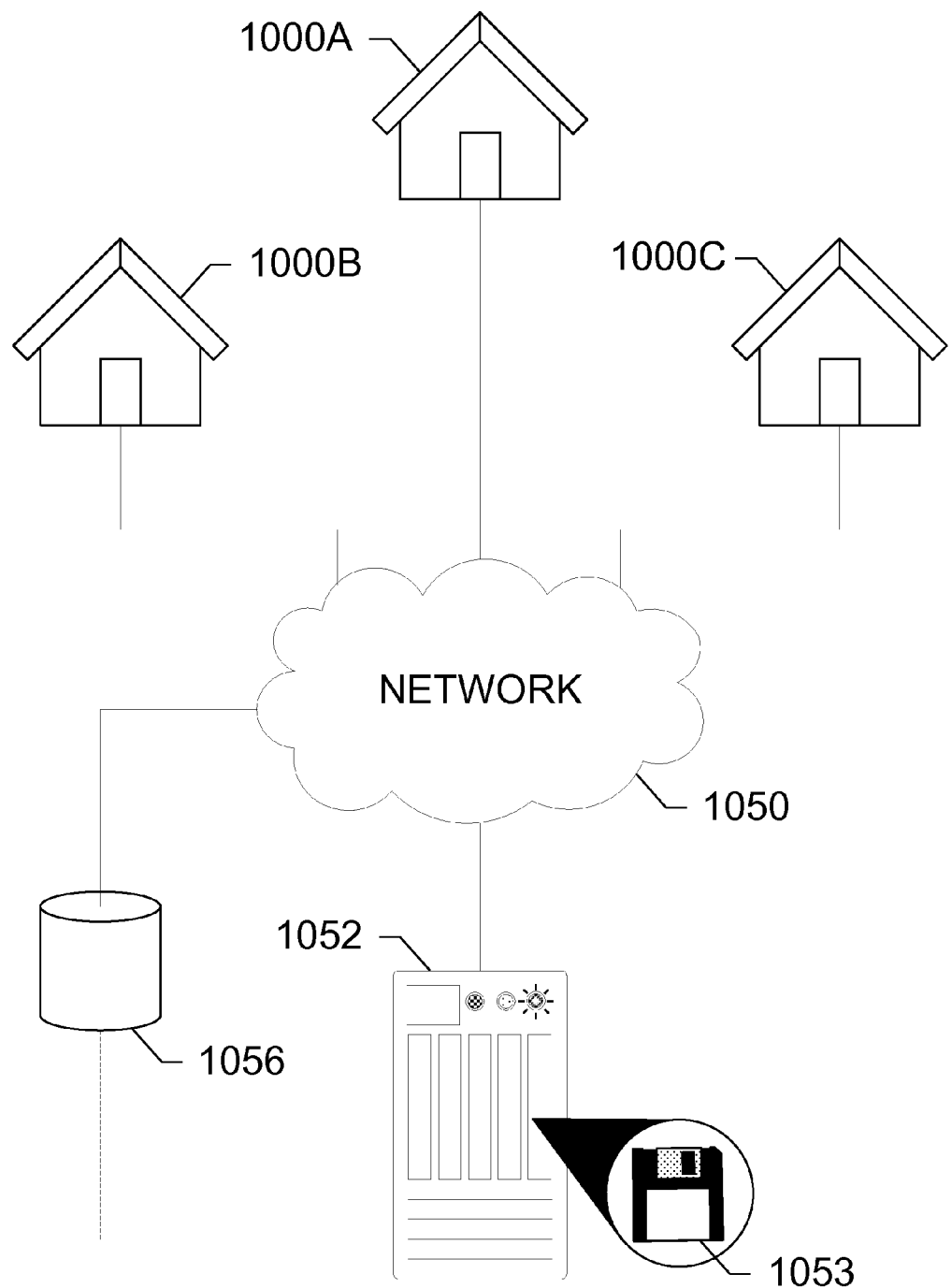
FIG. 10 shows a network of interactive home inventory systems, according to an example embodiment of the subject disclosure.

FIG. 10 shows a network of interactive home inventory systems, according to an example embodiment of the subject disclosure. The network of home inventory systems may include a home inventory system 1000A, a home inventory system 1000B, a home inventory system 1000C, a network 1050, a community inventory server 1052 including community inventory logic 1053, and a database 1056. Home inventory systems 1000A, 1000B, and 1000C may all be within the same neighborhood, belong to the same cooperative community, etc., and users of home inventory systems 1000A, 1000B, and 1000C may have agreed to pool their purchasing power in pursuit of better deals, delivery assistance, etc. Network 1050 may facilitate communication among home inventory systems 1000A, 1000B, and 1000C, and community inventory server 1052. Community inventory server 1052 may maintain inventories of each of home inventory systems 1000A, 1000B, and 1000C. When informing merchants of needed or desired products, community inventory server 1052 may inform the merchant of a greater total amount of the needed or desired product. Though only three home inventory systems are shown, whole neighborhoods, cooperative communities, etc., all belonging to the same network may result in requests for very large amounts of a product. In turn, this may lead to even greater discounts on needed or desired products.

Community inventory server 1052 may also inform users of ways to help other users belonging to the same network. For instance, community inventory logic 1053 may determine that the user of home inventory system 1000B is at a store that also sells a product that the user of home inventory system 1000C needs. An alert may be sent to the user of home inventory system 1000B to inform the user of this helpful purchase. Community inventory logic 1053 may allow the user of home inventory system 1000C to be billed for the purchase of the needed product instead of the user of home inventory system 1000B. In another example, a user of home inventory system 1000A may be informed that the user of home inventory system 1000B has a bundle of products awaiting pick-up at the same store at which the user of home inventory system 1000A is currently shopping. In yet another example, if the user of home inventory system 1000C is currently out of a needed product, but is already awaiting delivery of the needed product, then community inventory logic 1053 may determine that the user of home inventory system 1000B has enough supply of a substantially similar product for the user of home inventory system 1000C to use while awaiting delivery. In response to this determination, community inventory server 1053 may make a suggestion to the user of home inventory system 1000C to contact the user of home inventory system 1000B. Prior to this suggestion, community inventory server 1052 may inquire the user of home inventory system 1000B to determine if assistance may be agreeable. Users of each home inventory system may use a form or equivalent means to customize their communication preferences, including the frequency of alerts, and blocking or indicating preferences for certain products and requests from other users. Database 1056 may include hardware to store inventories, communication preferences, blocking or indicating preferences, etc., and may be accessed by community inventory server 1052 to assist in performance of operations in community inventory logic 1053.

Figure 11:
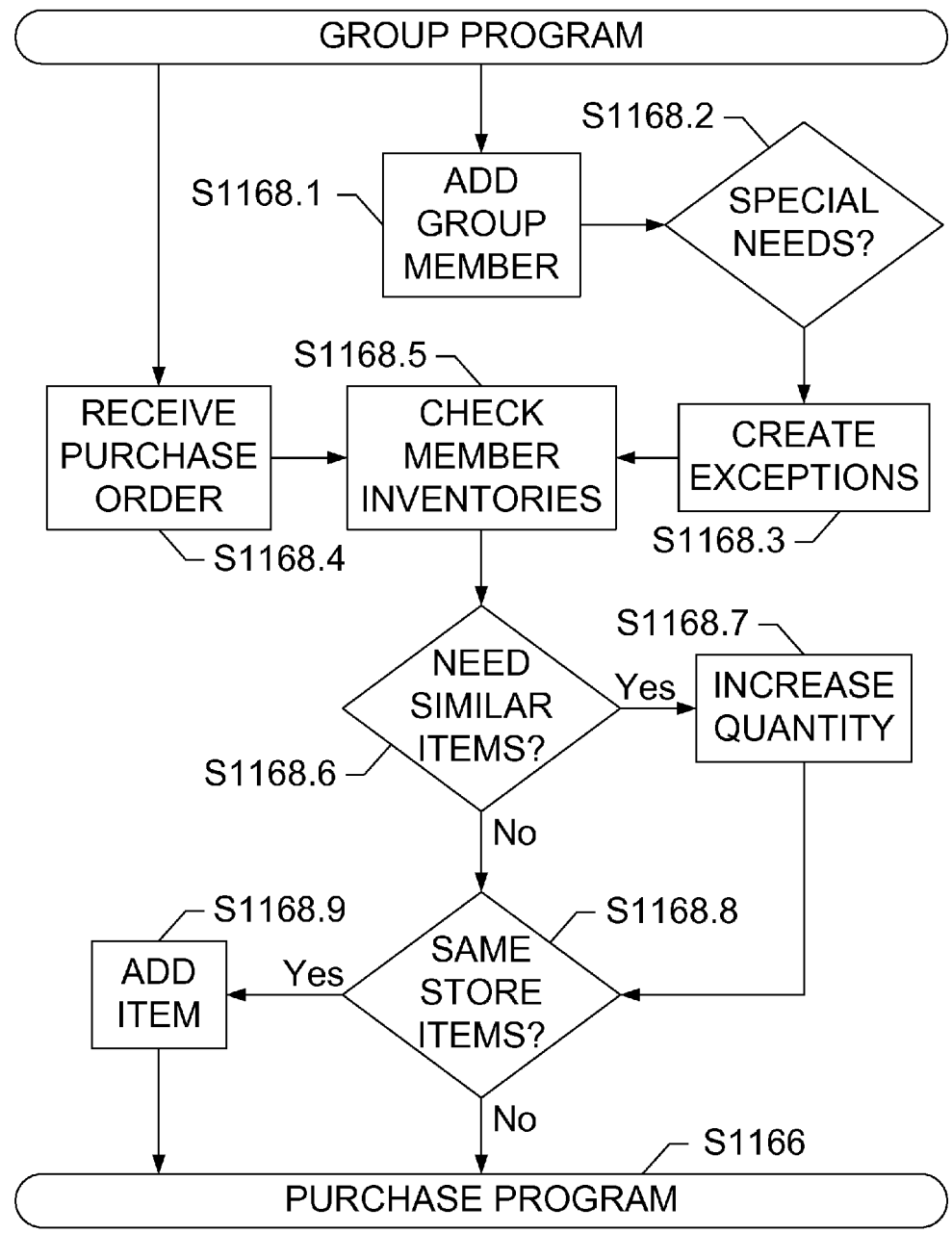
FIG. 11 shows a method for making informed purchases for a community, according to an example embodiment of the subject disclosure.

FIG. 11 shows a method for making informed purchases for a community, according to an example embodiment of the subject disclosure. The method may begin with a member being added to a community inventory system (S1168.1). During the addition of the community member, the community member may be asked to enter any special needs or preferences (S1168.2). If the community member does have special needs or preferences, then those special needs or preferences may be stored as well as exceptions for community features (S1168.3).

A community inventory server may receive a purchase order for needed or desired products (S1168.4). Before beginning a purchase program, the community inventory server may check inventories of other members of the community inventory system, subject to any exceptions (S1168.5). The community inventory server may determine whether any other community members are in need of the same or substantially similar products (S1168.6). If there are other community members that need or desire the same or substantially similar products, then the quantity of each matching product is increased to accommodate the other community members' needs and desires (S1168.7). Once the quantity of products has been increased or it is determined that no quantity needs to be increased, the community inventory server may then determine whether any other community members are in need of other products from the same merchant (S1168.8). Even if the price per product cannot be decreased from a bulk order, shipping costs can still be decreased by having the bundle of products for more community members shipped at the same time, or community members can assist in picking up the products while they are picking up their own products. If there are other community members that need or desire products from the same merchant, then those products are added to the order (S1168.9). Once the products have been added to the order or it is determined that no quantity should be increased, the community inventory server may then proceed to the purchase program (S1166).

Figure 12:
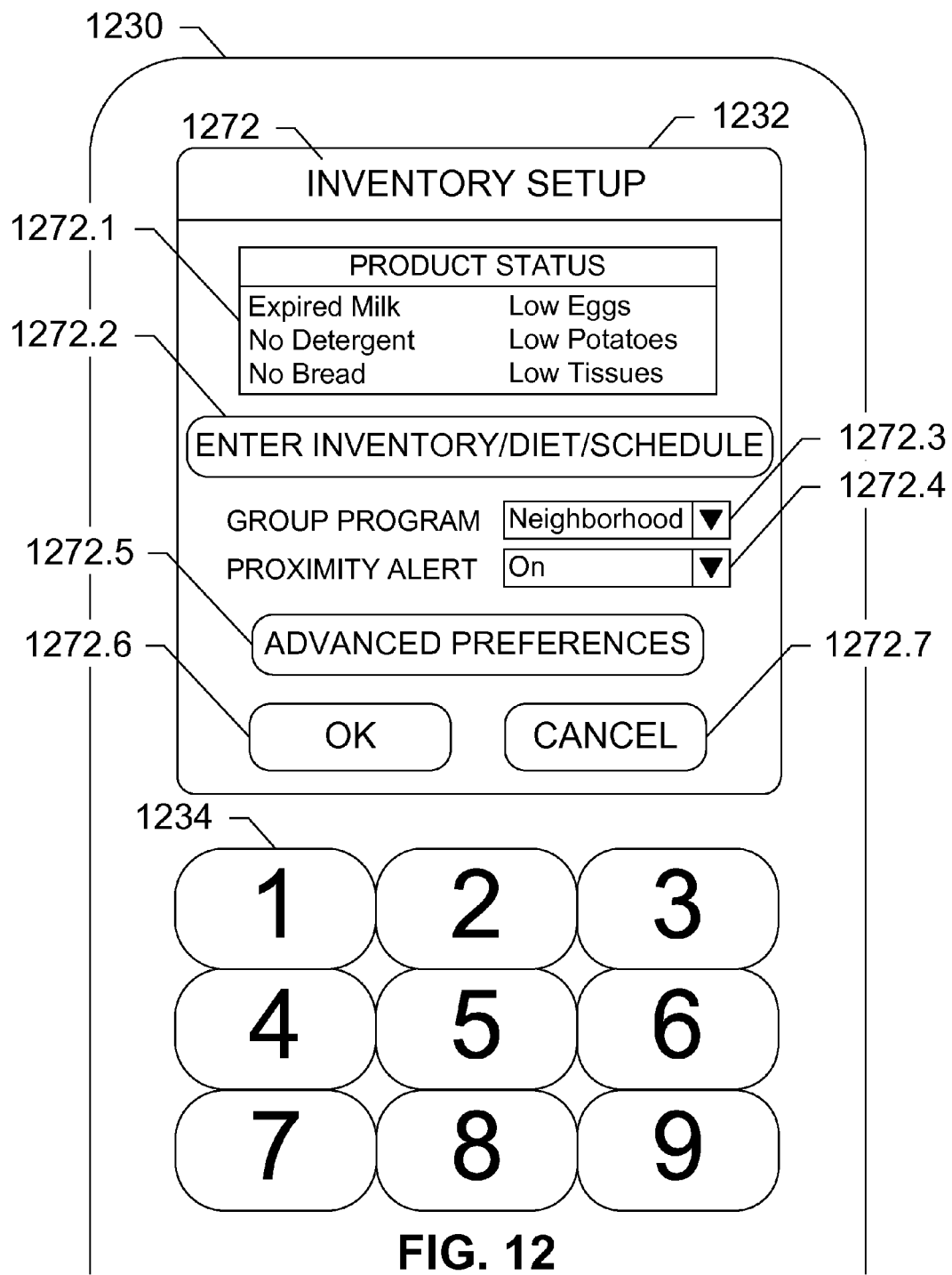
FIG. 12 shows a user interface for gathering information and specifying preferences for an interactive home inventory system, according to an example embodiment of the subject disclosure.

FIG. 12 shows a user interface for gathering information and specifying preferences for an interactive home inventory system, according to an example embodiment of the subject disclosure. An inventory setup 1272 may be shown on a display 1232 of a mobile device 1230. Inventory setup 1272 may include a product status 1272.1, an enter information selection 1272.2, a community or group inventory system option 1272.3, a proximity alert option 1272.4, an advanced preferences selection 1272.5, a confirmation selection 1272.6, and a cancellation selection 1272.7. Product status 1272.1 may include detailed information about the quantity and quality of products within a home inventory system. According to product status 1272.1, a milk product may have expired, and no bread or detergent remains, as indicated. This indication may let the user know that the user is in need of milk, detergent, and bread. Also according to product status 1272.1, there are not many eggs, potatoes, or tissues left. This indication may let the user know that the amount of eggs, potatoes, and tissues has dropped below a threshold amount. This threshold amount may be a default amount, a user-specified amount, etc.

Enter information selection 1272.2 may be selected to specify information that may be pertinent to making decisions concerning the inventory. Information may be entered about the default inventory or specific products in the inventory, which may help the inventory system to compare the products currently existing within the home inventory system with the products that the user may need or desire. For instance, information may also be entered about the user's current diet, which may help the inventory system determine new or alternate products or recipes to recommend to the user. The user may also enter activities on the user's schedule, or link the setup application 1272.1 with a calendar application, which may help the inventory system remind the user to buy products for future activities.

If the user participates in a community inventory system, then the user may specify the community inventory system within community system inventory option 1272.3. In this example embodiment, the user of mobile device 1230 has specified membership in a neighborhood inventory system which may be analogous to a farm-share, community-supported agriculture (CSA), etc. Proximity alert option 1272.4 may allow the location of mobile device 1230 to be monitored by the inventory system so that the user may be alerted when the user is within proximity of a product that is needed or desired. Advanced preferences selection 1272.5 may be selected to specify details such as minimum amounts of products, brands/merchants to avoid, proximity limitations, etc. Confirmation selection 1272.6 may be selected to save the currently entered information for immediate use in the inventory system. Upon selection of confirmation selection 1272.6, mobile device 1230 may send the saved information to a router, a central inventory server, etc. Cancellation selection 1272.7 may be selected to discard the currently entered information. Options and selections may be activated by utilizing an input 1234. Display 1232 may be a touch screen allowing the user to activate options and selections simply by touching the area of display 1232 showing the respective option or selection.

Figure 13:
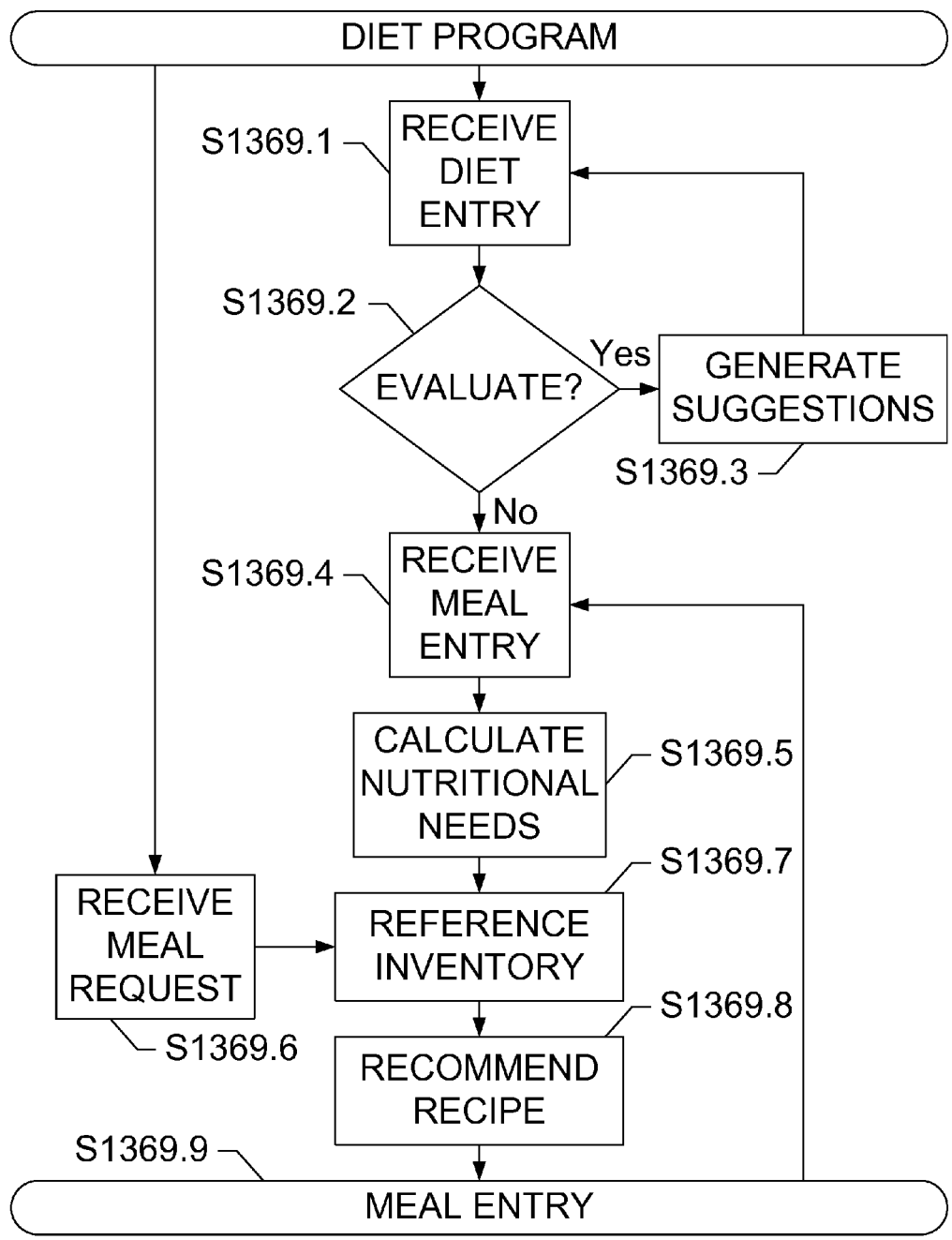
FIG. 13 shows a method for recommending recipes based on an inventory and a diet program, according to an example embodiment of the subject disclosure.

FIG. 13 shows a method for recommending recipes based on an inventory and a diet program, according to an example embodiment of the subject disclosure. A user of a home inventory system may specify a diet program by entering details of the diet program onto a mobile device, computer, etc. Once entered, the details of the diet program are received (S1369.1) by a home inventory system, central inventory server, etc. Once received, the user may choose to have the details of the diet program evaluated (S1369.2). This evaluation may consist of a health analysis, a cost analysis, etc. Evaluation S1369.2 may occur in conjunction with the user's budget, with external information sources such as the community, expert opinions on the internet, etc. Once the evaluation is complete, suggestions may be generated to help the user tailor the diet program to their nutritional needs, lifestyle, budget, etc (S1369.3). The user may incorporate these suggestions into the diet program until the user is satisfied with the diet program. Once the user is satisfied with the diet program, no further evaluation may be needed, and the diet program is ready to receive meal entries. Meal entries may be sent from the mobile device of the user, a merchant server of a restaurant, etc., after the user has eaten a meal. These meal entries, which may be sent along with nutritional information about the meal, are received by the inventory system (S1369.4).

Once received, nutritional needs of the user may be calculated to make recommendations concerning meals and products (S1369.5). For instance, the user of the home inventory system may request a meal recommendation based on products currently within the home inventory system and nutritional needs according to their diet program. A meal request may be received (S1369.6) from the mobile device, computer, etc. Once received, possible recipes that fit the diet program are compared with the products currently within the home inventory system until a recipe which matches the user's nutritional needs includes ingredients that are all currently available (S1369.7). This recipe may then be recommended to the user (S1369.8) by sending the recipe to the mobile device, etc. If more than one recipe meets these criteria, then multiple recipes may be presented to the user, or the inventory system may decide which recipe to recommend based on cost, most available ingredients, user-input preferences, etc. The user may elect to prepare the meal according to recipe (1369.9), in which case the meal is entered (S1369.4) for further nutritional calculations. As meals are entered and received, nutritional needs are calculated and updated for future recipe recommendations.

Figure 14:
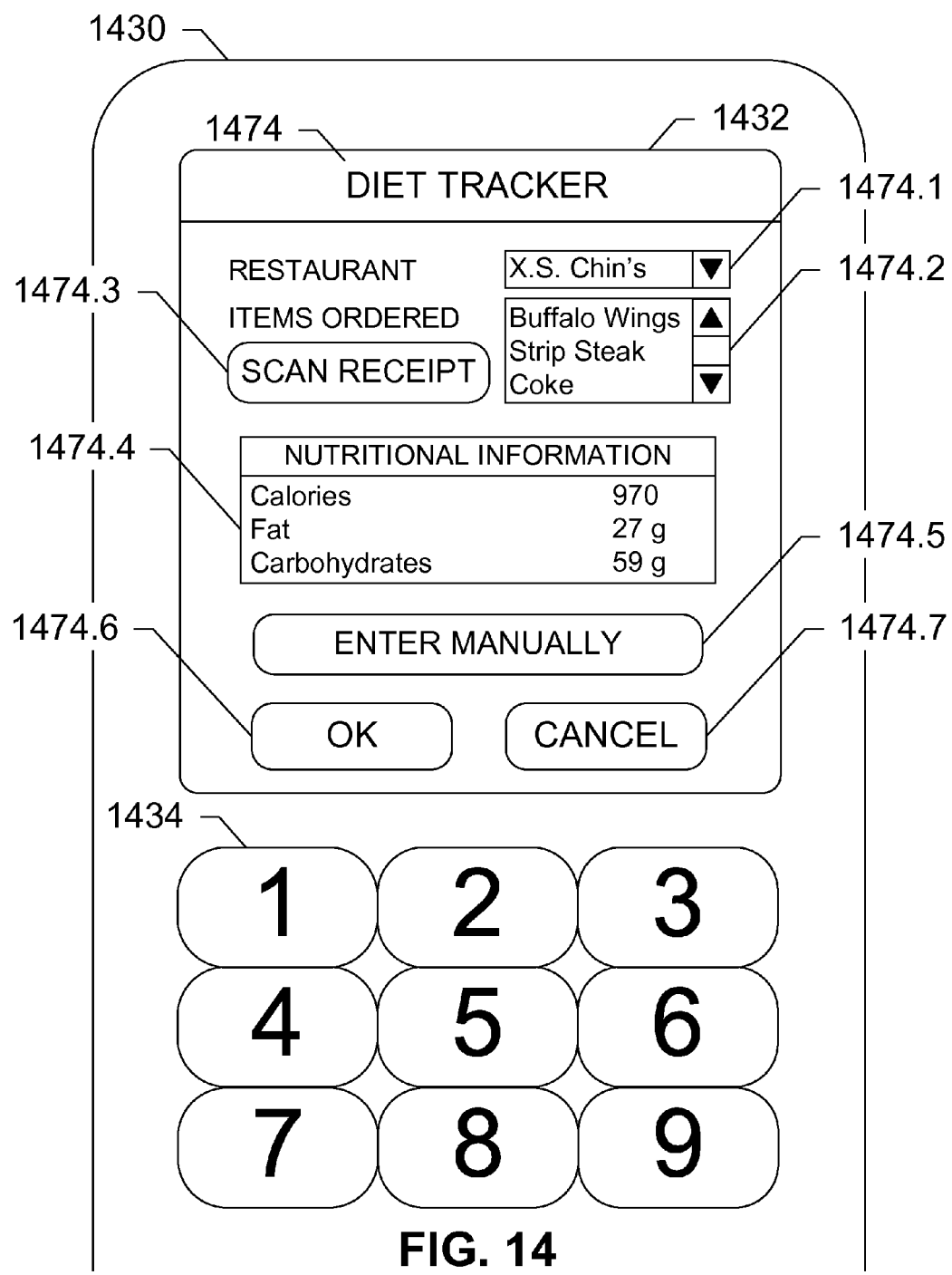
FIG. 14 shows a user interface for tracking meals according to a diet program, according to an example embodiment of the subject disclosure.

FIG. 14 shows a screen-shot of a user interface for tracking meals according to a diet program, according to an example embodiment of the subject disclosure. A diet tracker 1474 may be shown on a display 1432 of a mobile device 1430. Diet tracker 1474 may include a restaurant option 1474.1, a restaurant menu item option 1474.2, a scan receipt selection 1474.3, a nutritional information detail 1474.4, a manual nutrition entry selection 1474.5, a confirmation selection 1474.6, and a cancellation selection 1474.7. Restaurant option 1474.1 may allow the user to enter the name of the restaurant of the last meal so that the menu items ordered may be easier to enter. The name of the restaurant may be detected based on the location of mobile device 1430, selected by the user, "pushed" to the user's mobile device by a close-in-proximity network device operated by the restaurant, etc. Once the name of the restaurant has been detected or entered, restaurant menu item option 1474.2 may display a list of menu items available at the restaurant. From this list of menu items, the user may select which menu items were consumed by the user during this meal. Another option may be to activate scan receipt selection 1474.3 to scan a receipt for the meal with a camera of mobile device 1430. The camera captures an image of the receipt, and the receipt is read by mobile device 1430 to determine the restaurant and the menu items consumed by the user during this meal.

Nutrition information detail 1474.4 may be automatically populated once the menu items have been selected by referencing a database of nutrition information. If no information is found, then manual nutrition entry selection 1474.5 may be activated to allow the user to manually enter the nutrition facts as well as specific quantities of the menu items consumed during this meal. Manual nutrition entry selection 1474.5 may also be activated to enter nutrition facts of homemade meals. Confirmation selection 1474.6 may be activated to enter the current meal for calculation of nutrition needs according to a diet program. Cancellation selection 1474.7 may be activated to discard the information currently entered. Options and selections may be activated by utilizing an input 1434. Display 1432 may be a touch screen allowing the user to activate options and selections simply by touching the area of display 1432 showing the respective option or selection.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents. Although the disclosed example embodiments are shown from the perspective of a consumer, several other entities may benefit from the features described. For instance, a restaurant, hotel, airline, etc. may monitor an inventory of their stored products and track consumption by their clients/guests. Other businesses such as retail outlets may incorporate the systems and methods described herein in their own storage units such as retail shelves, warehouses, fleet of vehicles, etc. These features may also apply to inventory management in vending machines, hospitals, schools, as well as for events such as conferences/conventions, etc.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A system comprising:
   an appliance comprising
      a plurality of sensors comprising a camera and a scale,
      a touch screen comprising a touch-sensitive surface and a display,
      an appliance processor, and
      an appliance memory storing appliance instructions that, when executed by the appliance processor, cause the appliance processor to perform appliance operations comprising:
         receiving, from a plurality of products stored within the appliance, wireless signals emitted by radiofrequency identifier tags associated with the plurality of products, wherein the plurality of products comprises a first product,
         identifying the plurality of products by processing the wireless signals to determine an identity of each of the plurality of products, displaying, to a user of the appliance, via the touch screen, at least a portion of the plurality of products stored within the appliance without requiring the user to open the appliance and access a location within the appliance where the at least a portion of the plurality of products is stored, receiving, from the camera, visual information associated with the first product, receiving, from the scale, a weight of the first product measured by the scale, determining, using at least the visual information associated with the first product from the camera and the weight of the first product from the scale, a remaining quantity of the first product, and receiving, via the touch-sensitive surface of the touch screen, input from the user inquiring about a product status of at least one of the plurality of products stored within the appliance; and a server in communication with the appliance, the server comprising a processor, and a memory storing server instructions that, when executed by the processor, cause the processor to perform operations comprising building an inventory comprising the plurality of products, comparing the inventory with a default inventory, the default inventory comprising a list of products used by the user associated with the system, the list of products comprising the first product, the default inventory further comprising a minimum quantity of each of the products of the list of products, determining, based on comparing the inventory with the default inventory, that the remaining quantity of the first product is less than the minimum quantity of the first product specified by the default inventory, in response to determining that the remaining quantity of the first product is less than the minimum quantity of the first product specified by the default inventory, determining whether the remaining quantity of the first product corresponds to an amount that necessitates purchasing the first product without action by the user, in response to determining that the remaining quantity of the first product is less than the minimum quantity but does not correspond to the amount that necessitates purchasing the first product without action by the user, monitoring a location of the user, and notifying the user of the first product when the user is within proximity of a merchant selling the first product, wherein notifying the user comprises sending, via a communication network, a product alert message to a mobile device of the user for display on the mobile device, accessing a calendar application associated with the user, wherein the calendar application provides a schedule of a plurality of activities associated with the user, determining a product associated with an activity of the plurality of activities of the calendar application, and notifying the user of a merchant selling the product associated with the activity, the activity of the plurality of activities associated with the product, and directions to the merchant selling the product associated with the activity when the user is within proximity of the merchant selling the product associated with the activity.

2. The system in claim 1, wherein the operations further comprise:

in response to determining that the remaining quantity of the first product is less than the minimum quantity of the first product specified by the default inventory, transmitting, to a merchant server, a request for an additional quantity of the first product;

receiving an offer from the merchant server, the offer including a price of the additional quantity of the first product; and forwarding the offer to the mobile device of the user.

3. The system in claim 1, wherein the operations further comprise receiving an expiration date for the first product and further receiving a notice of recalled products.

4. The system in claim 1, wherein the operations further comprise receiving nutrition information associated with the plurality of products.

5. The system of claim 1, wherein the operations further comprise:

monitoring purchase habits of the user to determine that a second product of the plurality of products associated with the purchase habits of the user is not on the list of products of the default inventory; and adding the second product to the list of products of the default inventory.

6. The system of claim 1, wherein the operations further comprise:

comparing the plurality of products of the inventory with a plurality of recipes;

determining that the plurality of products of the inventory comprises required products of a recipe of the plurality of recipes; and in response to determining that the plurality of products of the inventory comprises the required products of the recipe of the plurality of recipes, transmitting the recipe to the mobile device.

7. The system of claim 1, wherein the operations further comprise receiving a notification of a purchased product.

8. The system of claim 7, wherein the operations further comprise:

determining that the purchased product has not been detected after an amount of time; and transmitting a reminder to the mobile device, the reminder indicating that the purchased product has not been detected.

9. The system of claim 1, wherein the operations further comprise receiving an advertisement for the first product, the advertisement comprising a discounted price.

10. A method comprising:

receiving, by an appliance of a system, from a plurality of products stored within the appliance, wireless signals emitted by radiofrequency identifier tags associated with the plurality of products, wherein the appliance comprises an appliance processor, a plurality of sensors comprising a camera and a scale, and a touch screen comprising a touch-sensitive surface and a display, and wherein the plurality of products comprises a first product;

identifying, by the appliance, the plurality of products by processing the wireless signals to determine an identity of each of the at least a portion of the plurality of products displaying, by the appliance, to a user of the appliance, via the touch screen, at least a portion of the plurality of products stored within the appliance without requiring the user to open and access a location within the appliance where the at least a portion of the plurality of products is stored;

receiving, by the appliance processor, from the camera, visual information associated with the first product;

receiving, by the appliance processor, from the scale, a weight of the first product measured by the scale;

determining, by the appliance, using at least the visual information associated with the first product from the camera and the weight of the first product from the scale, a remaining quantity of the first product;

receiving, by the appliance, via the touch-sensitive surface of the touch screen, input from the user inquiring about a product status of at least one of the plurality of products stored within the appliance;

building, by a server of the system, an inventory comprising the plurality of products, wherein the server comprises a processor;

comparing, by the server, the inventory with a default inventory, the default inventory comprising a list of products used by the user associated with the system, the list of products comprising the first product, the default inventory further comprising a minimum quantity of each of the products of the list of products;

determining, by the server based on comparing the inventory with the default inventory, that the remaining quantity of the first product is less than the minimum quantity of the first product specified by the default inventory;

in response to determining that the remaining quantity of the first product is less than the minimum quantity of the first product specified by the default inventory, determining, by the server, whether the remaining quantity of the first product corresponds to an amount that necessitates purchasing the first product without action by the user;

in response to determining that the remaining quantity of the first product is less than the minimum quantity but does not correspond to the amount that necessitates purchasing the first product without action by the user, monitoring, by the server, a location of the user, and notifying, by the server, the user of the first product when the user is within proximity of a merchant selling the first product, wherein notifying the user comprises sending, via a communication network, a product alert message to a mobile device of the user for display on the mobile device;

accessing, by the server, a calendar application associated with the user, wherein the calendar application provides a schedule of a plurality of activities associated with the user;

determining, by the server, a product associated with an activity of the plurality of activities of the calendar application; and notifying, by the server, the user of a merchant selling the product associated with the activity, the activity of the plurality of activities associated with the product, and directions to the merchant selling the product associated with the activity when the user is within proximity of the merchant selling the product associated with the activity.

11. The method of claim 10, further comprising:
comparing the plurality of products of the inventory with a plurality of recipes;
determining that the plurality of products of the inventory comprises required products of a recipe of the plurality of recipes; and
in response to determining that the plurality of products of the inventory comprises the required products of the recipe of the plurality of recipes, transmitting the recipe to the mobile device.

12. The method of claim 10, further comprising receiving a notification of a purchased product.

13. The method of claim 12, further comprising:
determining that the purchased product has not been detected after an amount of time; and
transmitting a reminder to the mobile device, the reminder indicating that the purchased product has not been detected.

14. The method of claim 10, further comprising:
monitoring purchase habits of the user associated with the default inventory to determine that a second product associated with the purchase habits of the user is not on the list of products of the default inventory; and
adding the second product to the list of products of the default inventory.

* * * * *